(12) United States Patent
Kusaka

(10) Patent No.: US 7,583,449 B2
(45) Date of Patent: Sep. 1, 2009

(54) ZOOM LENS AND IMAGE PICKUP APPARATUS HAVING THE SAME

(75) Inventor: Yusuke Kusaka, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 61 days.

(21) Appl. No.: 12/030,111

(22) Filed: Feb. 12, 2008

(65) Prior Publication Data
US 2008/0291546 A1 Nov. 27, 2008

(30) Foreign Application Priority Data
Feb. 15, 2007 (JP) ............................. 2007-034759

(51) Int. Cl.
*G02B 15/14* (2006.01)
(52) U.S. Cl. ....................... 359/687; 359/686
(58) Field of Classification Search ............... 359/683, 359/686, 687
See application file for complete search history.

(56) References Cited
U.S. PATENT DOCUMENTS
5,268,790 A 12/1993 Chen
6,157,494 A 12/2000 Nagata
6,606,200 B1 * 8/2003 Nakayama et al. .......... 359/686

FOREIGN PATENT DOCUMENTS
JP 11-311743 11/1999

* cited by examiner

*Primary Examiner*—David N Spector
(74) *Attorney, Agent, or Firm*—Canon USA Inc IP Div

(57) ABSTRACT

A zoom lens includes, in order from an object side to an image side, a first lens unit having a positive refractive power configured not to move for zooming, a second lens unit having a negative refractive power configured to move during zooming, a third lens unit having a positive refractive power configured to move during zooming, and a fourth lens unit having a positive refractive power configured not to move for zooming. The third lens unit includes a positive lens, a negative lens, and a diffractive optical element. A focal length of the third lens unit (fc), a focal length of the diffractive optical element (fdoe), a focal length at a wide angle end of the zoom lens (fW), and a focal length at a telephoto end of the zoom lens (fT) satisfy the following conditions:

$0.35 < fc/\sqrt{(fW \cdot fT)} < 0.81$, and $45 < fdoe/fc < 300$.

15 Claims, 21 Drawing Sheets

ZOOM LENS AND IMAGE PICKUP APPARATUS HAVING THE SAME

BACKGROUND OF THE INVENTION

1. Field of the Invention

The present invention relates to a zoom lens and to an image pickup apparatus having the zoom lens.

2. Description of the Related Art

In recent years, zoom lenses having large aperture ratios, high zoom ratios, and high optical performance have been demanded for image pickup apparatuses, such as television cameras, silver-halide film camera, digital still cameras, and video cameras.

In image pickup apparatuses, such as broadcasting color television cameras, color separation optical systems and various filters are disposed at a front side (object side) of an image sensor. Accordingly, zoom lenses having long back focal distances have been demanded therefor.

A so-called positive-lead type four-unit zoom lens, in which a lens unit having a positive refractive power is disposed at the most object side, is known as the zoom lens having a large-aperture, a wide angle of view, a high zoom ratio, and a long back focal distance.

The four-unit zoom lens includes, in order from an object side to an image side, a first lens unit having a positive refractive power, which includes a focusing lens unit, a second lens unit (variator lens unit for varying magnification) having a negative refractive power, a third lens unit having a positive refractive power, which compensates for variation of an image plane due to magnification variation, and a fourth lens unit (image forming lens unit) having a positive refractive power.

U.S. Pat. No. 5,268,790 and No. 6,157,494 discuss a positive-lead type four-unit zoom lens capable of correcting chromatic aberration with a diffractive optical element located in the zoom lens to enhance optical performance.

U.S. Pat. No. 5,268,790 discusses a zoom lens having a zoom ratio of about 10 with a diffractive optical element located in a second or third lens unit.

U.S. Pat. No. 6,157,494 discusses a zoom lens having a zoom ratio of about 10 with a diffractive optical element located in a third lens unit.

The correction for chromatic aberration is facilitated by using a diffractive optical element in a part of the optical system of the zoom lens. Thus, zoom lenses having high zoom ratios and high optical performance can easily be configured.

However, in a case where the position and the optical power of a diffractive optical element to be located in an optical system of a zoom lens and the lens configuration of a lens unit including the diffractive optical element are inappropriately set, it is difficult to favorably correct chromatic aberration and to achieve high optical performance.

For example, in the case of the above-described positive-lead type four-unit zoom lens, it is important for increasing an aperture ratio and a zoom ratio to appropriately set the lens configuration of the third lens unit that is located closer to an image side than the second lens unit and that compensate for variation of an image plane due to magnification variation.

In a case where the lens configuration of the third lens unit is inappropriately set, even the zoom lens provided with a diffractive optical element neither reduces the variation of aberration caused by zooming, (for example, that of chromatic aberration, spherical aberration, halo, coma, and color difference due to spherical aberration) nor achieves a high zoom ratio and high optical performance.

Particularly, when the zoom ratio is enhanced, axial chromatic aberration at the telephoto end is increased. Consequently, it is difficult to correct residual aberration (secondary spectrum).

SUMMARY OF THE INVENTION

At least one exemplary embodiment of the present invention is directed to a zoom lens and/or image pickup apparatuses having such zoom lenses (e.g., a zoom lens applicable to, for example, a broadcasting television camera, a video camera, a digital still camera, or a silver-halide film camera and other image pickup apparatuses as known by one of ordinary skill in the relevant arts). At least further one exemplary embodiment of the present invention is directed to a zoom lens that corrects chromatic aberration over the entire zooming range from a wide-angle end to a telephoto end and has high optical performance over the entire zooming range, and/or image pickup apparatuses having such zoom lenses.

According to an aspect of the present invention, a zoom lens includes, in order from an object side to an image side, a first lens unit having a positive refractive power, a second lens unit having a negative refractive power configured to move during zooming, a third lens unit having a positive refractive power configured to move during zooming, and a fourth lens unit having a positive refractive power, characterized in that the third lens unit includes a positive lens, a negative lens, and a diffractive optical element, and that a focal length (fc) of the third lens unit, a focal length (fdoe) of a diffraction portion of the diffractive optical element, a focal length (fW) at a wide angle end of the zoom lens, and a focal length (fT) at a telephoto end of the zoom lens satisfy the following conditions:

$$0.35 < fc/\sqrt{(fW \cdot fT)} < 0.81, \text{ and}$$

$$45 < fdoe/fc < 300.$$

According to another aspect of the present invention, an image pickup apparatus includes the above-described zoom lens and a solid-state image sensor configured to receive an image of an object (photographic object) formed by the zoom lens.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DETAILED DESCRIPTION OF THE EMBODIMENTS

Figure 1:
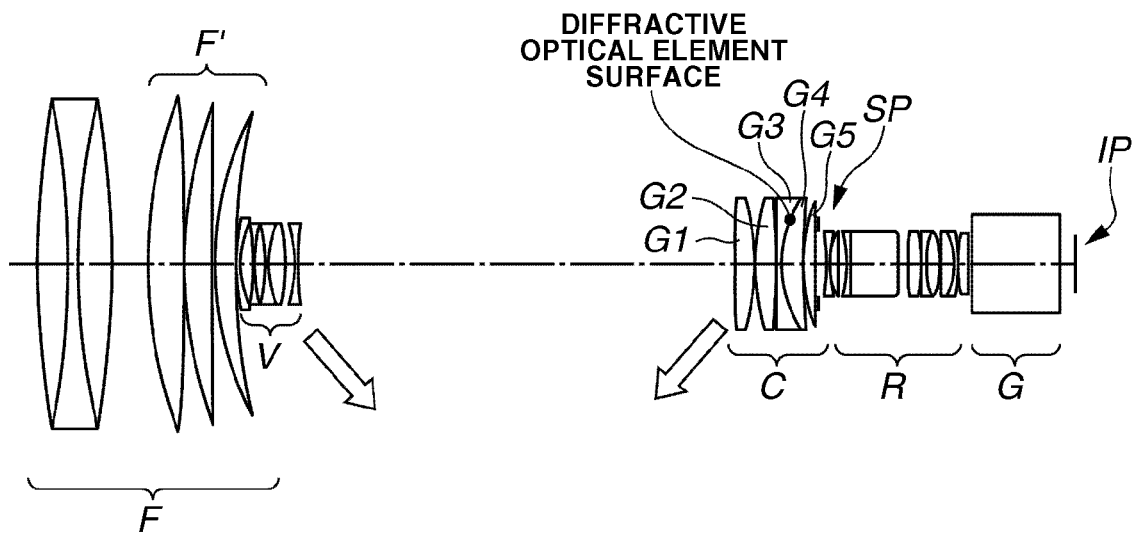
FIG. 1 is a cross-sectional view of a zoom lens according to a first exemplary embodiment of the present invention in a case where focusing is performed on an infinitely distant object.

Various exemplary embodiments, features, and aspects of the invention will now be described in detail with reference to the drawings. It should be noted that the relative arrangement of the components, the numerical expressions and numerical values set forth in the exemplary embodiments are provided by way of example only, and do not limit the scope of the present invention unless it is specifically stated otherwise.

The following description of at least one exemplary embodiment is merely illustrative in nature and is in no way intended to limit the invention, its application or uses. Processes, techniques, apparatus, and materials as known by one of ordinary skill in the relevant art may not be discussed in detail but are intended to be part of the enabling description where appropriate, for example, the fabrication of the lens elements and their materials. In all of the examples illustrated and discussed herein any specific values, for example, the zoom ratio and F-number, should be interpreted to be illustrative only and non-limiting. Thus, other examples of the exemplary embodiments could have different values. Notice that similar reference numerals and letters refer to similar items in the following figures, and thus once an item is defined in one figure, it need not be discussed for following figures. Note that herein when referring to correcting or corrections of an error (e.g., an aberration), a reduction of the error and/or a correction of the error is intended.

A zoom lens according to an exemplary embodiment of the present invention includes, in order from an object side to an image side, a first lens unit F having a positive refractive power configured to be stationary during zooming, a second lens unit (variator lens unit for varying magnification) V having a negative refractive power configured to monotonically move towards the image side during zooming from a wide-angle end (short focal length end) to a telephoto end (long focal length end), a third lens unit C having a positive refractive power, including a diffractive optical element, configured to monotonically move towards the object side during zooming to compensate for variation of an image plane due to magnification variation, and a fourth lens unit R having a positive refractive power configured to be stationary during zooming and to form an image. As described above, the first lens unit and the fourth lens unit are stationary during zooming. This means that the first lens unit and the fourth lens unit do not move for zooming (to perform zooming). That is, during zooming, the first lens unit and the fourth lens unit can move for the purpose of performing focusing, simultaneously with zooming, or for other reasons.

FIG. 1 is a cross-sectional view of a zoom lens at the wide-angle end of the zooming range according to a first exemplary embodiment of the present invention.

Figure 2:
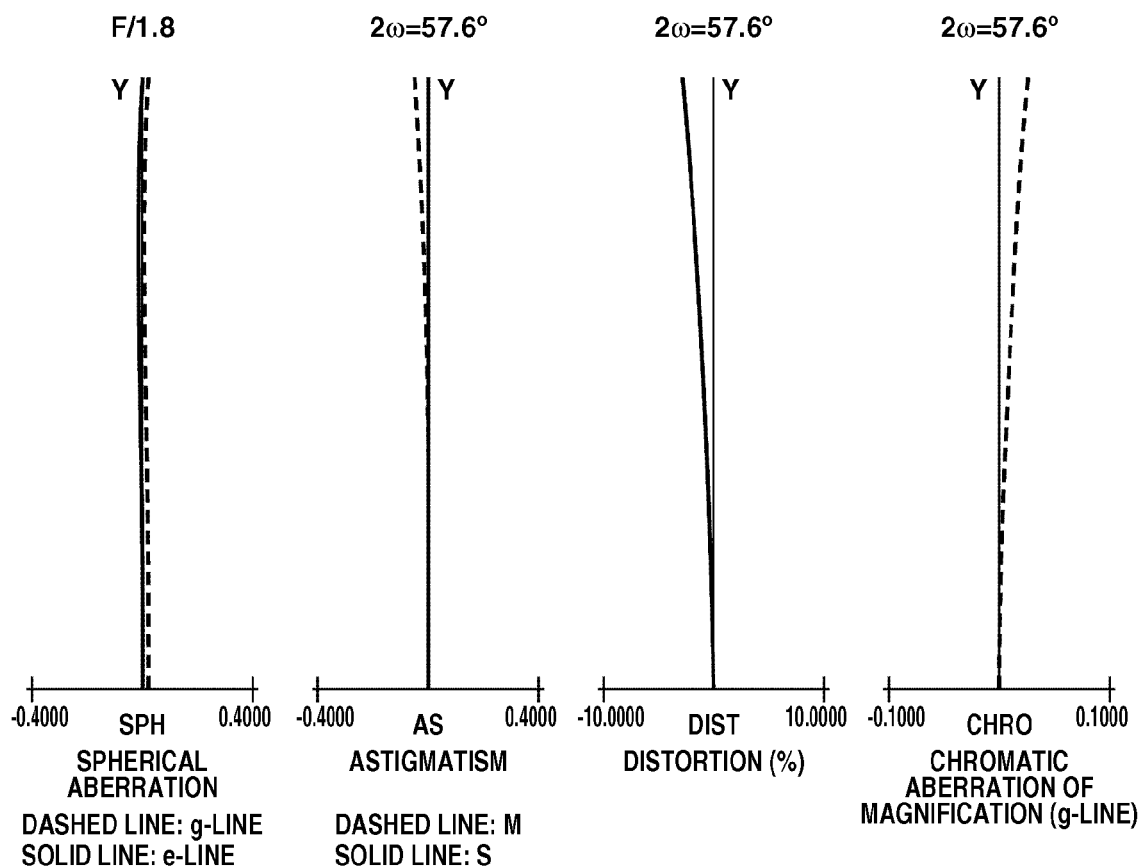
FIG. 2 illustrates longitudinal aberration diagrams of the zoom lens at the wide-angle end according to the first exemplary embodiment of the present invention in the case where focusing is performed on an infinitely distant object.
Figure 3:
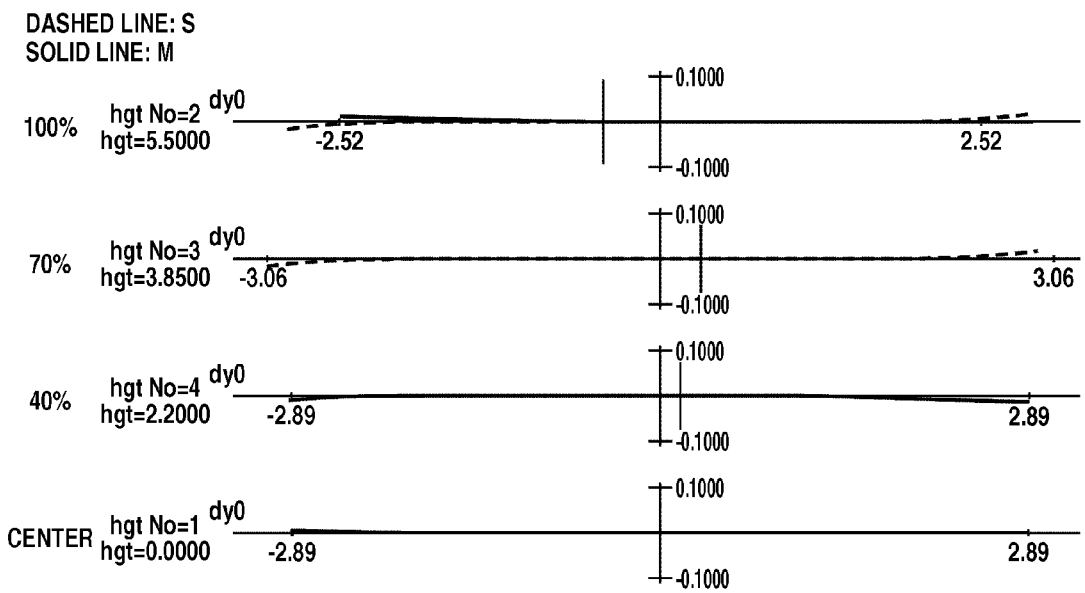
FIG. 3 illustrates lateral aberration diagrams of the zoom lens at the wide-angle end according to the first exemplary embodiment of the present invention in the case where focusing is performed on an infinitely distant object.

FIG. 2 illustrates longitudinal aberration diagrams of the zoom lens at the wide-angle end according to the first exemplary embodiment of the present invention in the case where focusing is performed on an infinitely distant object. FIG. 3 illustrates lateral aberration diagrams of the zoom lens at the wide-angle end according to the first exemplary embodiment of the present invention in such a case.

Figure 4:
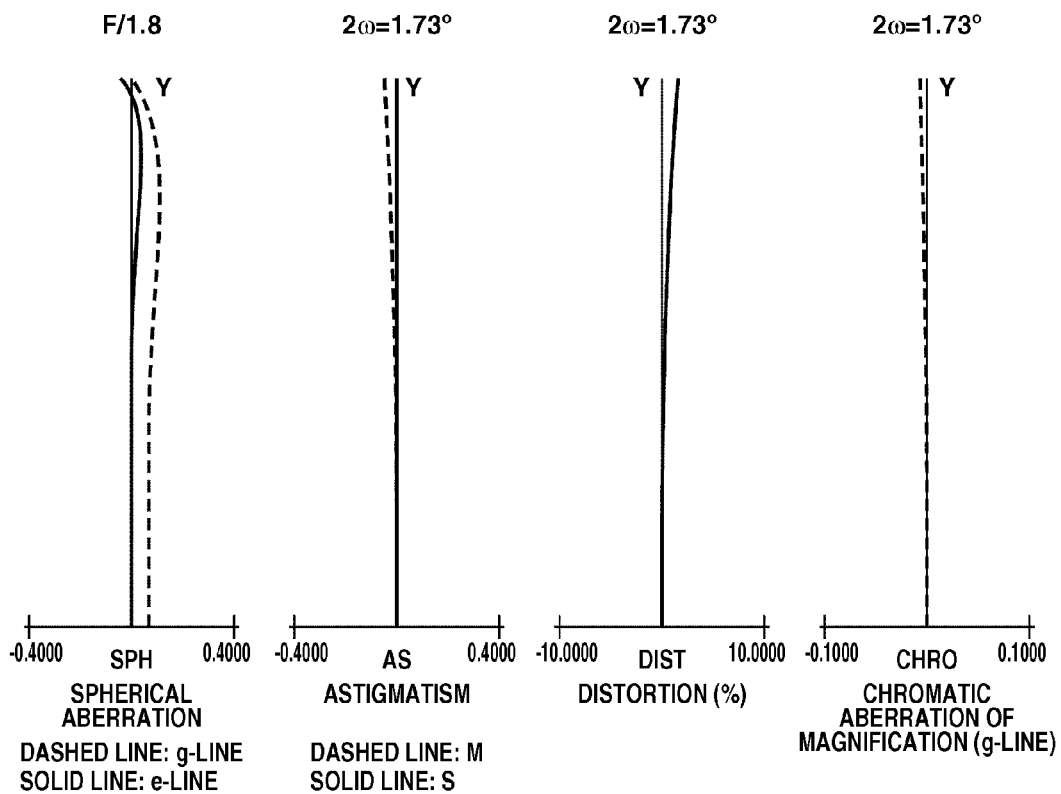
FIG. 4 illustrates longitudinal aberration diagrams of the zoom lens at an F-drop point, which will be described later, according to the first exemplary embodiment of the present invention in the case where focusing is performed on an infinitely distant object.
Figure 5:
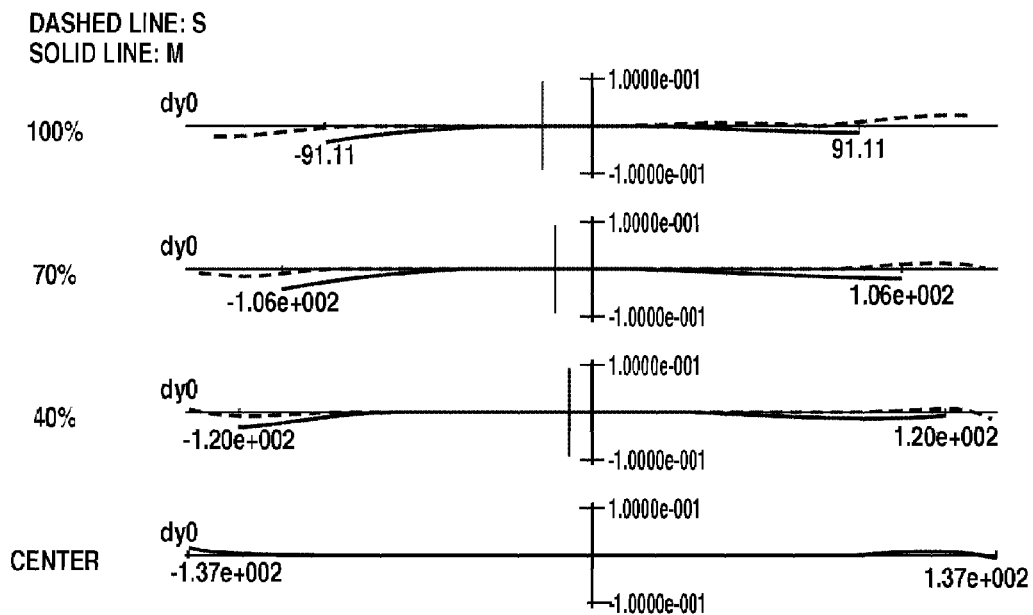
FIG. 5 illustrates lateral aberration diagrams of the zoom lens at the F-drop point according to the first exemplary embodiment of the present invention in the case where focusing is performed on an infinitely distant object.

FIG. 4 illustrates longitudinal aberration diagrams of the zoom lens at an F-drop point according to the first exemplary embodiment of the present invention in the case where focusing is performed on an infinitely distant object. FIG. 5 illustrates lateral aberration diagrams of the zoom lens at the F-drop point according to the first exemplary embodiment of the present invention in such a case.

Figure 6:
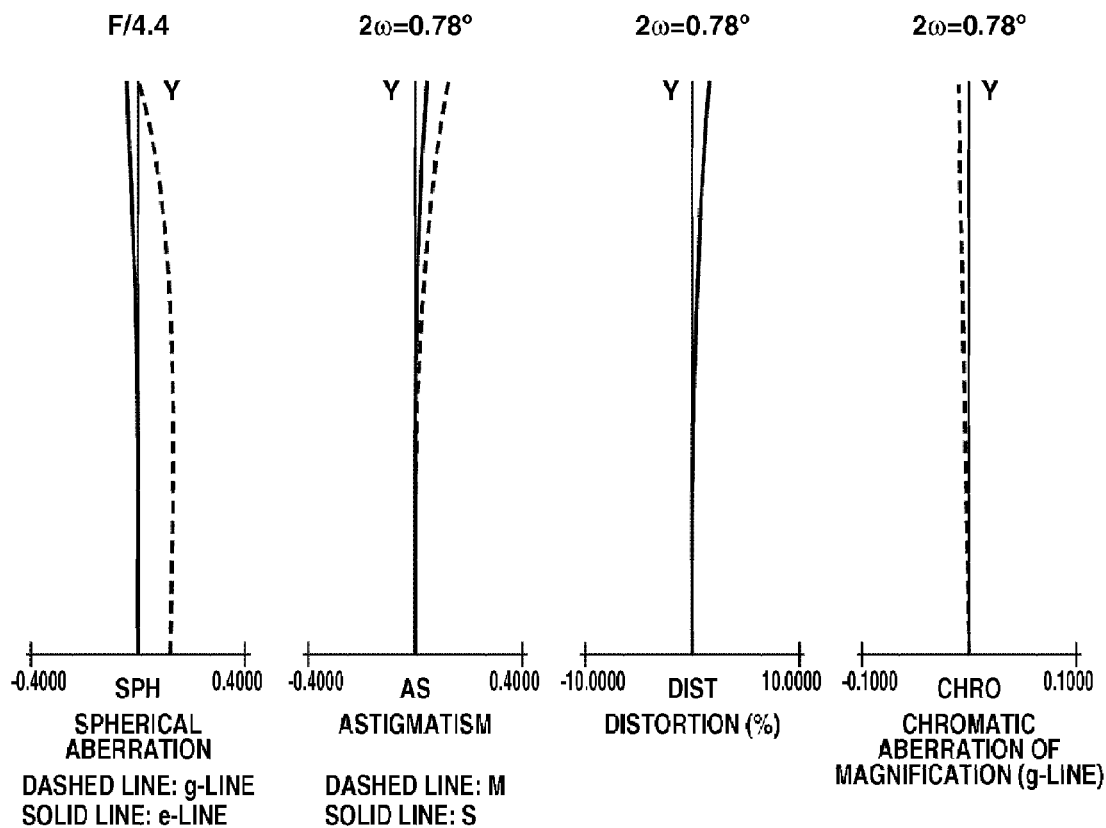
FIG. 6 illustrates longitudinal aberration diagrams of the zoom lens at the telephoto end according to the first exemplary embodiment of the present invention in the case where focusing is performed on an infinitely distant object.
Figure 7:
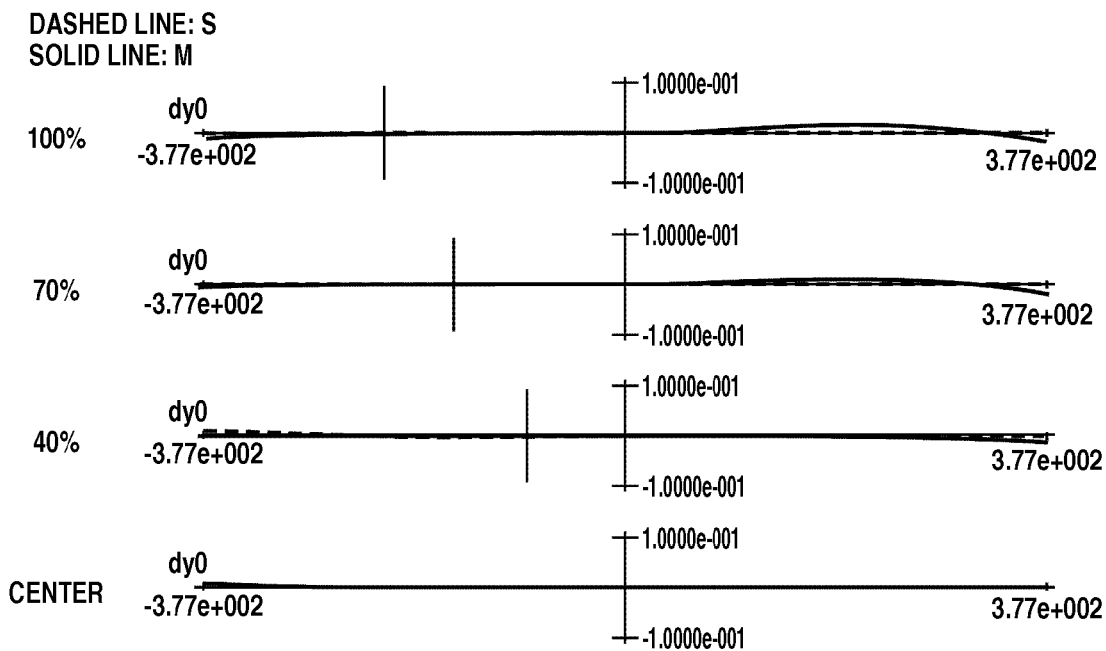
FIG. 7 illustrates lateral aberration diagrams of the zoom lens at the telephoto end according to the first exemplary embodiment of the present invention in the case where focusing is performed on an infinitely distant object.

FIG. 6 illustrates longitudinal aberration diagrams of the zoom lens at the telephoto end of the zooming range according to the first exemplary embodiment of the present invention in the case where focusing is performed on an infinitely distant object. FIG. 7 illustrates lateral aberration diagrams of the zoom lens at the telephoto end according to the first exemplary embodiment of the present invention in such a case.

Figure 8:
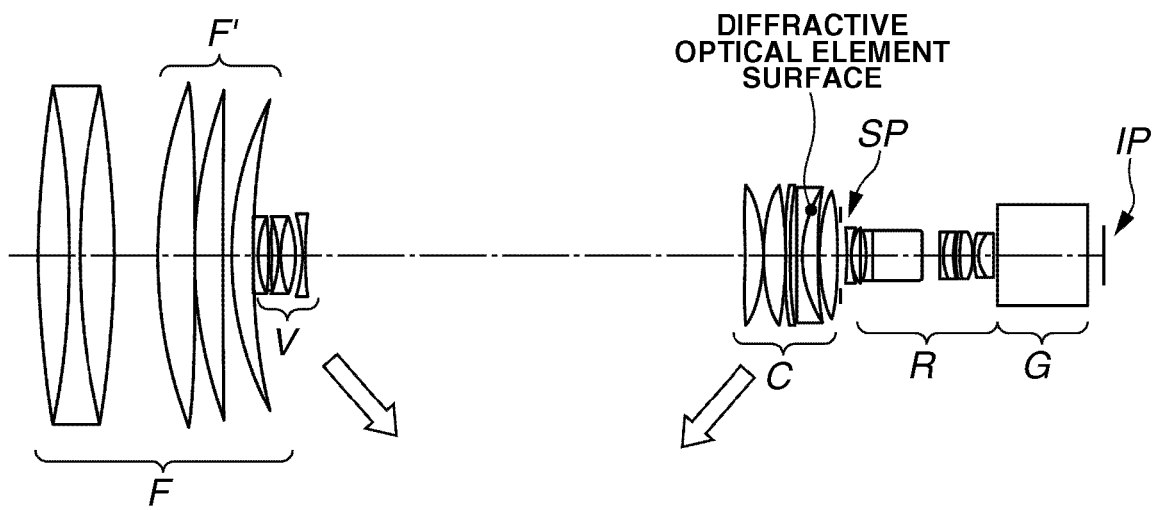
FIG. 8 is a cross-sectional view of a zoom lens according to a second exemplary embodiment of the present invention in the case where focusing is performed on an infinitely distant object.

FIG. 8 is a cross-sectional view of a zoom lens at the wide-angle end of the zooming range according to a second exemplary embodiment of the present invention.

Figure 9:
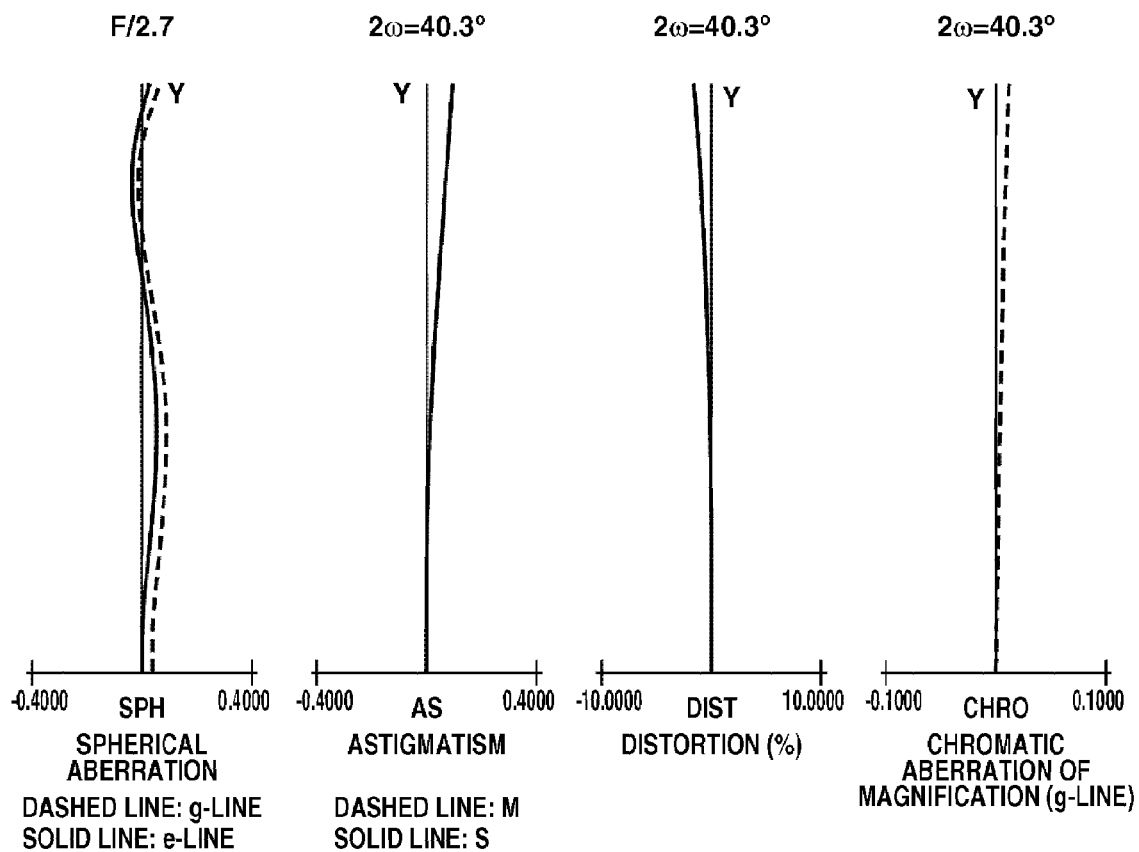
FIG. 9 illustrates longitudinal aberration diagrams of the zoom lens at the wide-angle end according to the second exemplary embodiment of the present invention in the case where focusing is performed on an infinitely distant object.
Figure 10:
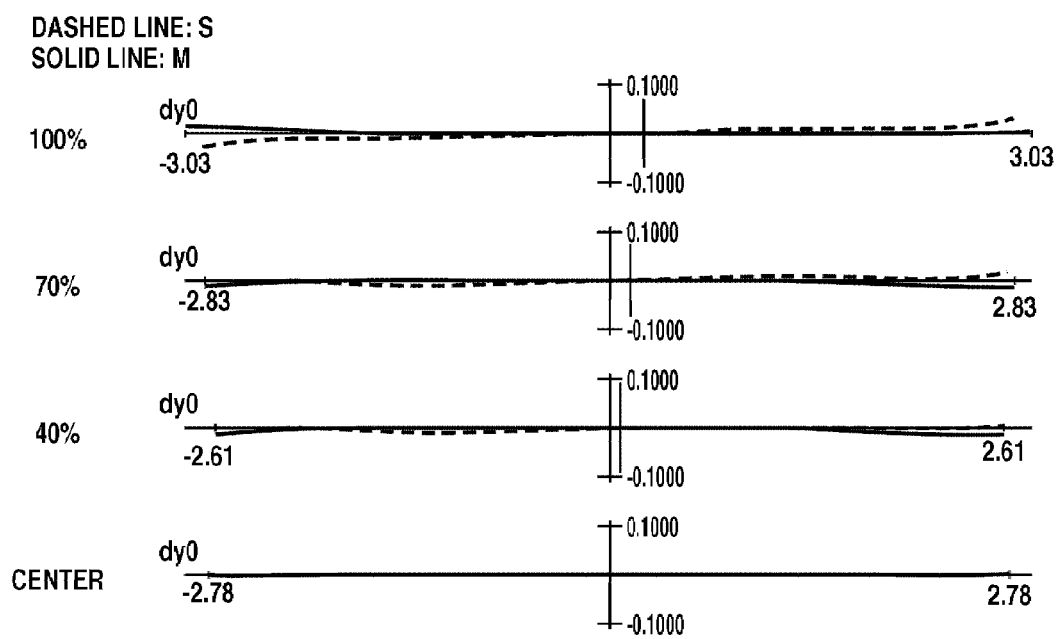
FIG. 10 illustrates lateral aberration diagrams of the zoom lens at the wide-angle end according to the second exemplary embodiment of the present invention in the case where focusing is performed on an infinitely distant object.

FIG. 9 illustrates longitudinal aberration diagrams of the zoom lens at the wide-angle end according to the second exemplary embodiment of the present invention in the case where focusing is performed on an infinitely distant object. FIG. 10 illustrates lateral aberration diagrams of the zoom lens at the wide-angle end according to the second exemplary embodiment of the present invention in such a case.

Figure 11:
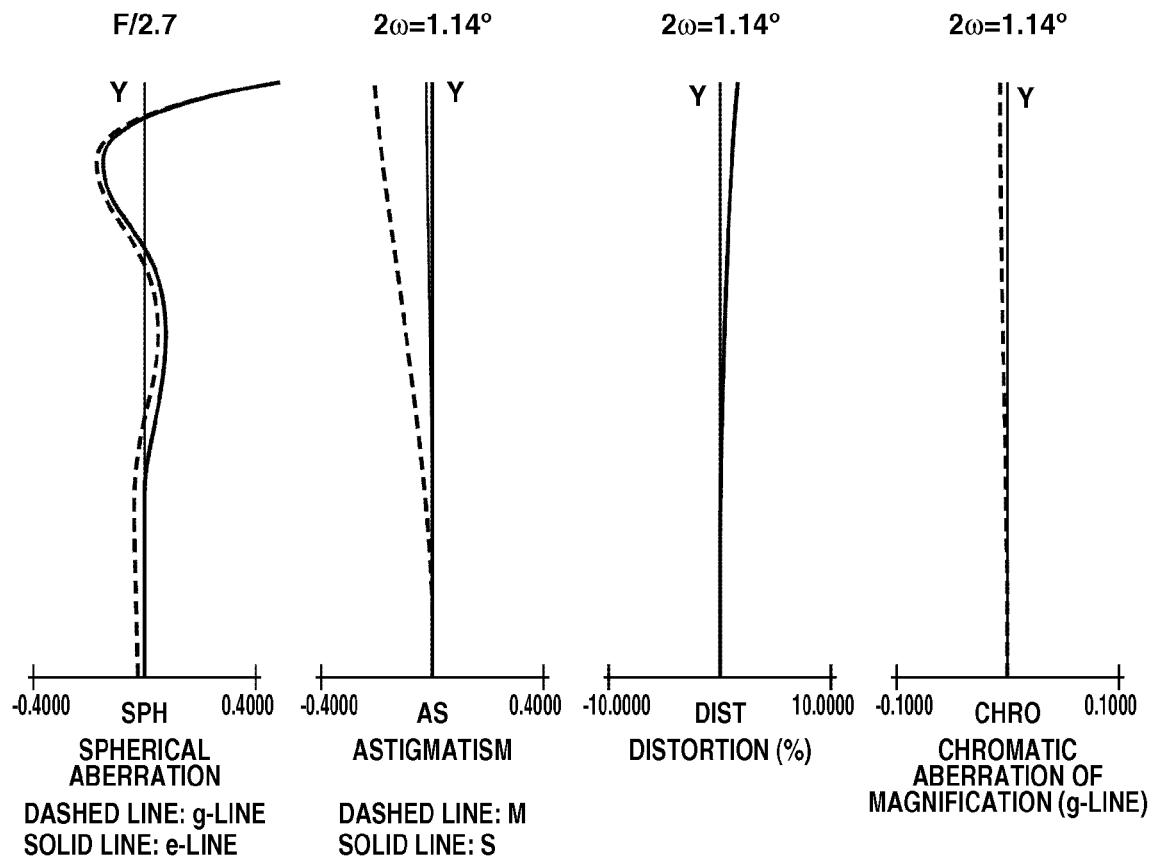
FIG. 11 illustrates longitudinal aberration diagrams of the zoom lens at an F-drop point according to the second exemplary embodiment of the present invention in the case where focusing is performed on an infinitely distant object.
Figure 12:
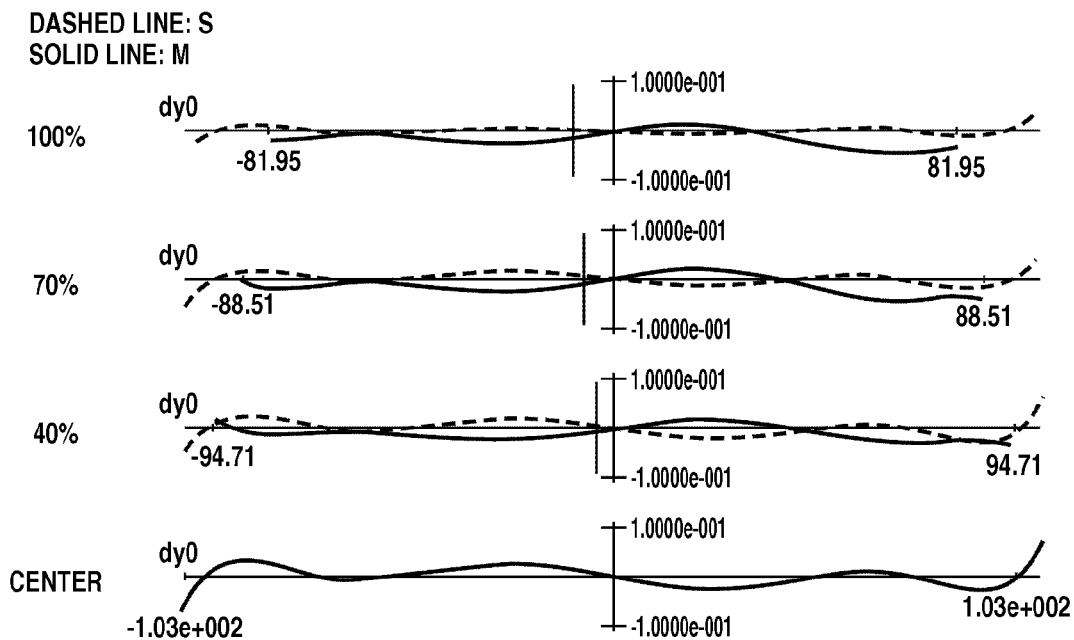
FIG. 12 illustrates lateral aberration diagrams of the zoom lens at the F-drop point according to the second exemplary embodiment of the present invention in the case where focusing is performed on an infinitely distant object.

FIG. 11 illustrates longitudinal aberration diagrams of the zoom lens at an F-drop point according to the second exemplary embodiment of the present invention in the case where focusing is performed on an infinitely distant object. FIG. 12 illustrates lateral aberration diagrams of the zoom lens at the F-drop point according to the second exemplary embodiment of the present invention in such a case.

Figure 13:
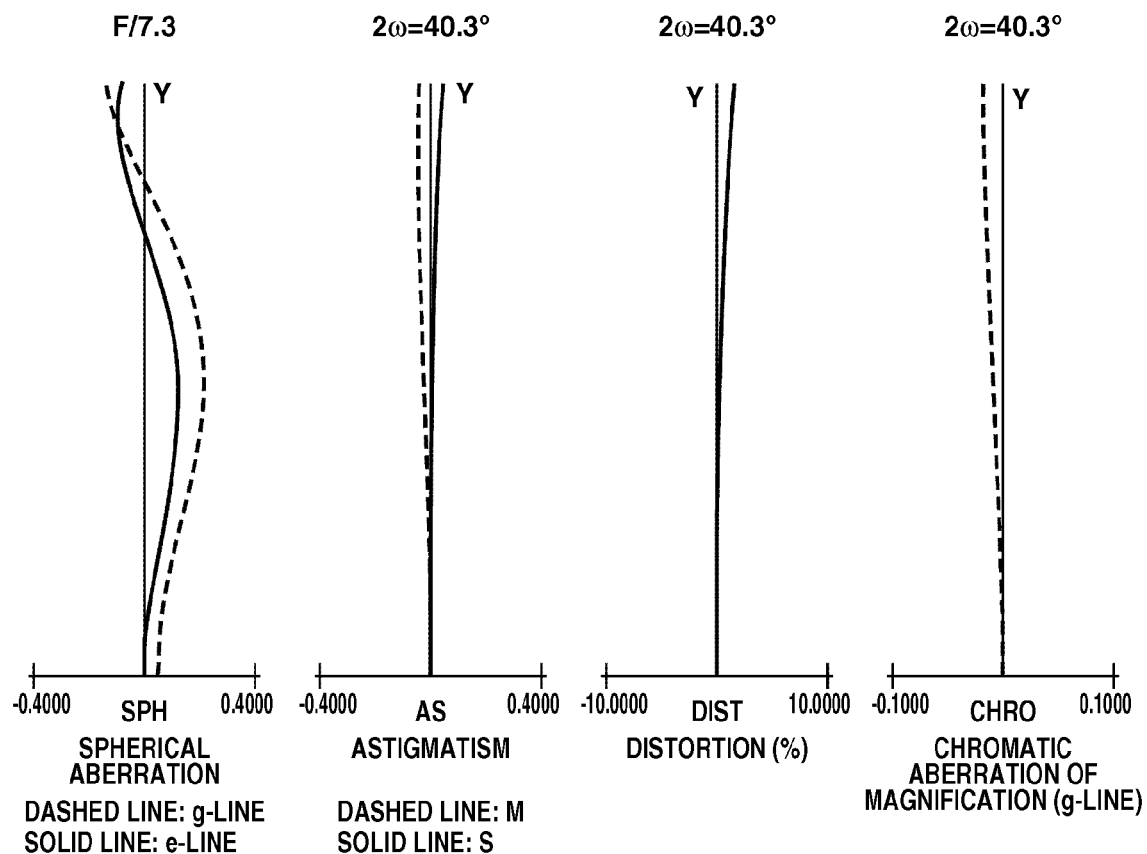
FIG. 13 illustrates longitudinal aberration diagrams of the zoom lens at the telephoto end according to the second exemplary embodiment of the present invention in the case where focusing is performed on an infinitely distant object.
Figure 14:
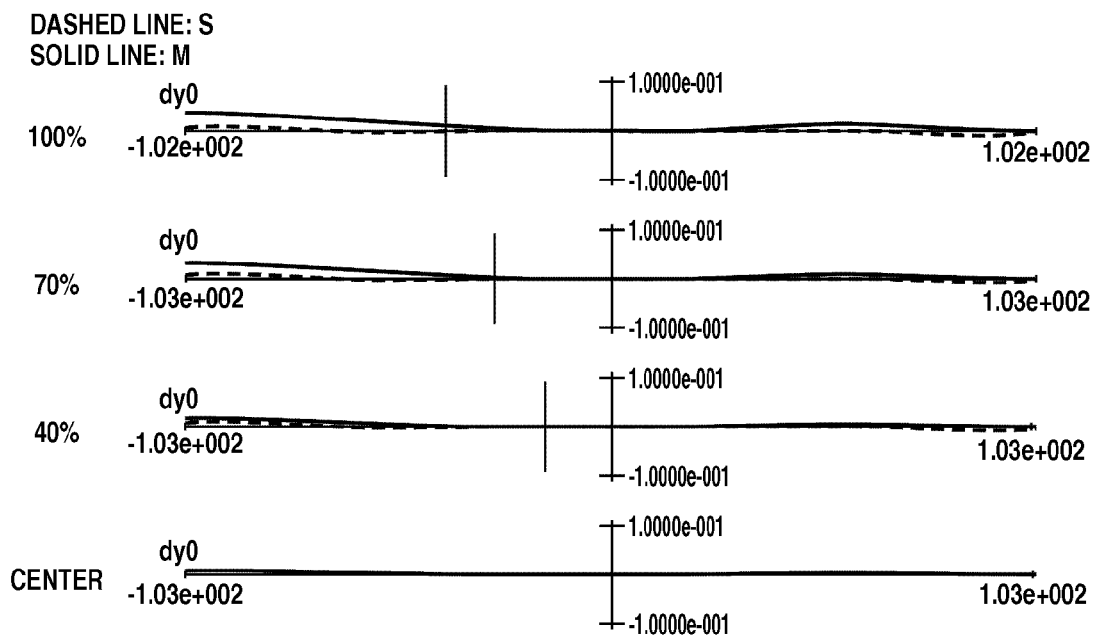
FIG. 14 illustrates lateral aberration diagrams of the zoom lens at the telephoto end according to the second exemplary embodiment of the present invention in the case where focusing is performed on an infinitely distant object.

FIG. 13 illustrates longitudinal aberration diagrams of the zoom lens at the telephoto end of the zooming range according to the second exemplary embodiment of the present invention in the case where focusing is performed on an infinitely distant object. FIG. 14 illustrates lateral aberration diagrams of the zoom lens at the telephoto end according to the second exemplary embodiment of the present invention in such a case.

Figure 15:
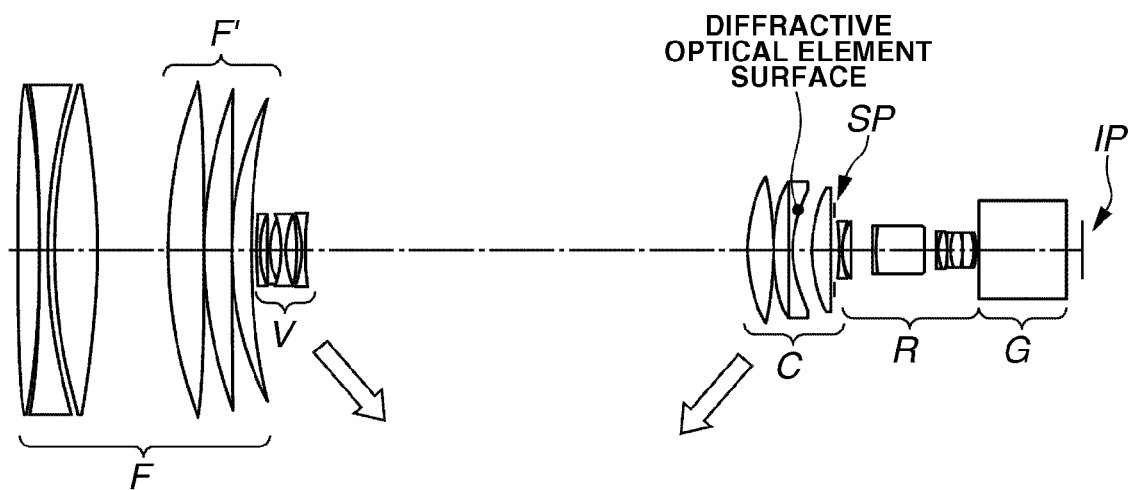
FIG. 15 is a cross-sectional view of a zoom lens according to a third exemplary embodiment of the present invention in the case where focusing is performed on an infinitely distant object.

FIG. 15 is a cross-sectional view of a zoom lens at the wide-angle end of the zooming range according to a third exemplary embodiment of the present invention.

Figure 16:
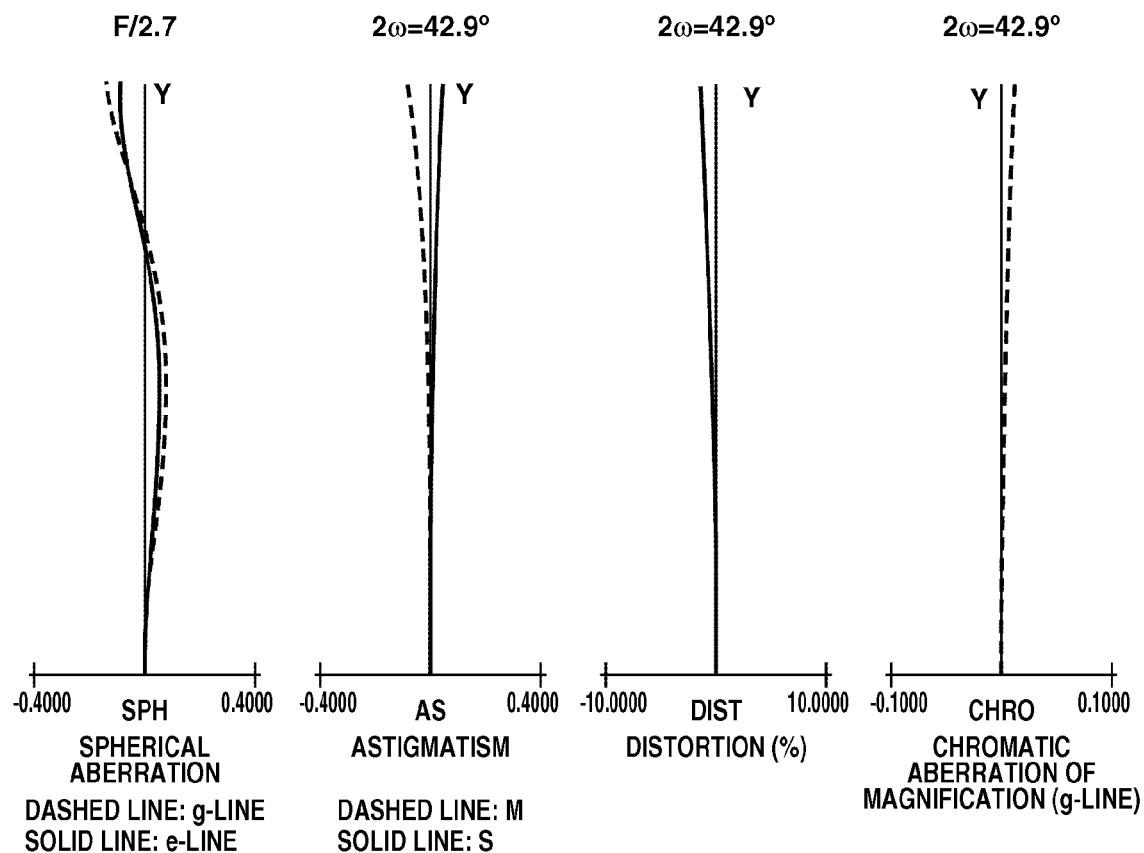
FIG. 16 illustrates longitudinal aberration diagrams of the zoom lens at a wide-angle end according to the third exemplary embodiment of the present invention in the case where focusing is performed on an infinitely distant object.
Figure 17:
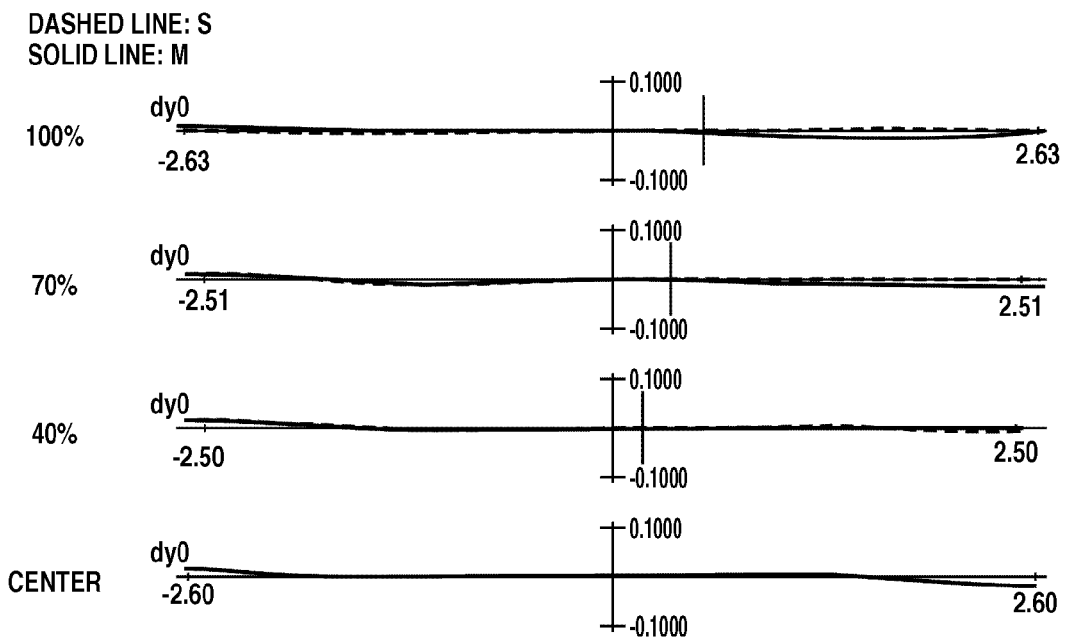
FIG. 17 illustrates lateral aberration diagrams of the zoom lens at the wide-angle end according to the third exemplary embodiment of the present invention in the case where focusing is performed on an infinitely distant object.

FIG. 16 illustrates longitudinal aberration diagrams of the zoom lens at the wide-angle end according to the third exemplary embodiment of the present invention in the case where focusing is performed on an infinitely distant object. FIG. 17 illustrates lateral aberration diagrams of the zoom lens at the wide-angle end according to the third exemplary embodiment of the present invention in such a case.

Figure 18:
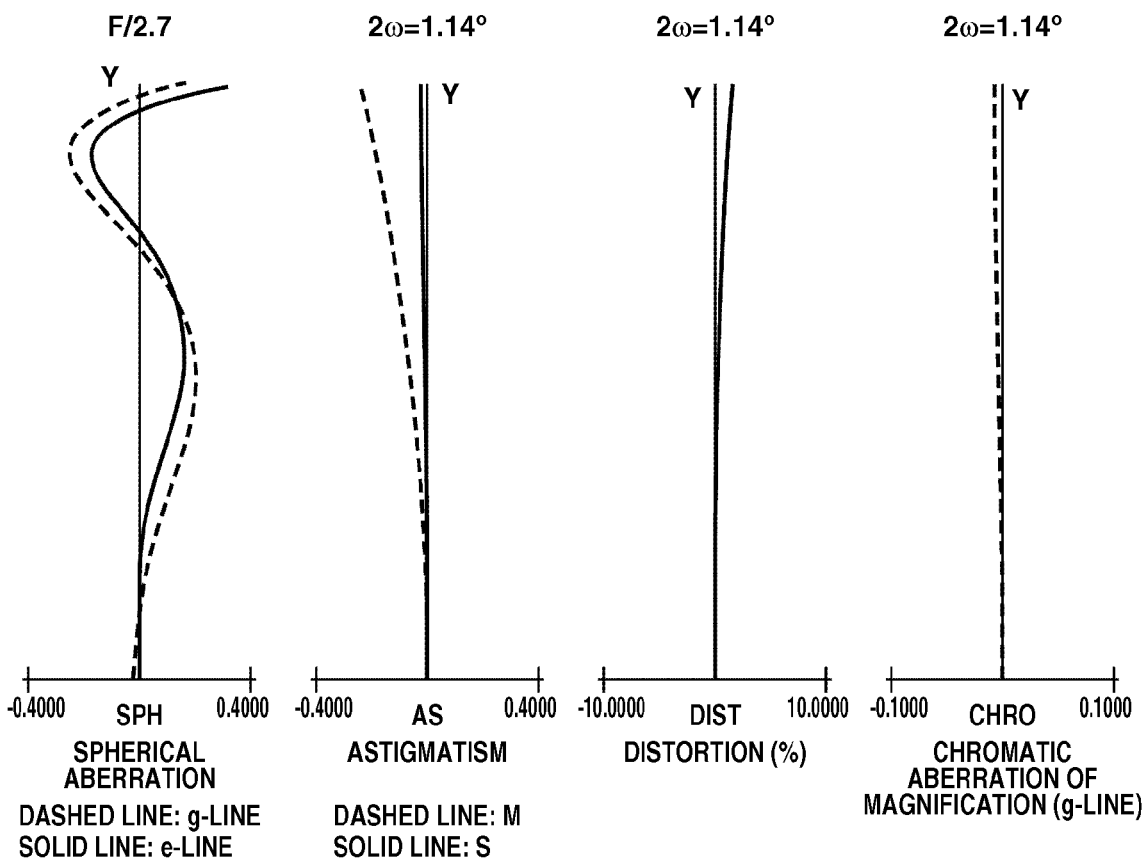
FIG. 18 illustrates longitudinal aberration diagrams of the zoom lens at an F-drop point according to the third exemplary embodiment of the present invention in the case where focusing is performed on an infinitely distant object.
Figure 19:
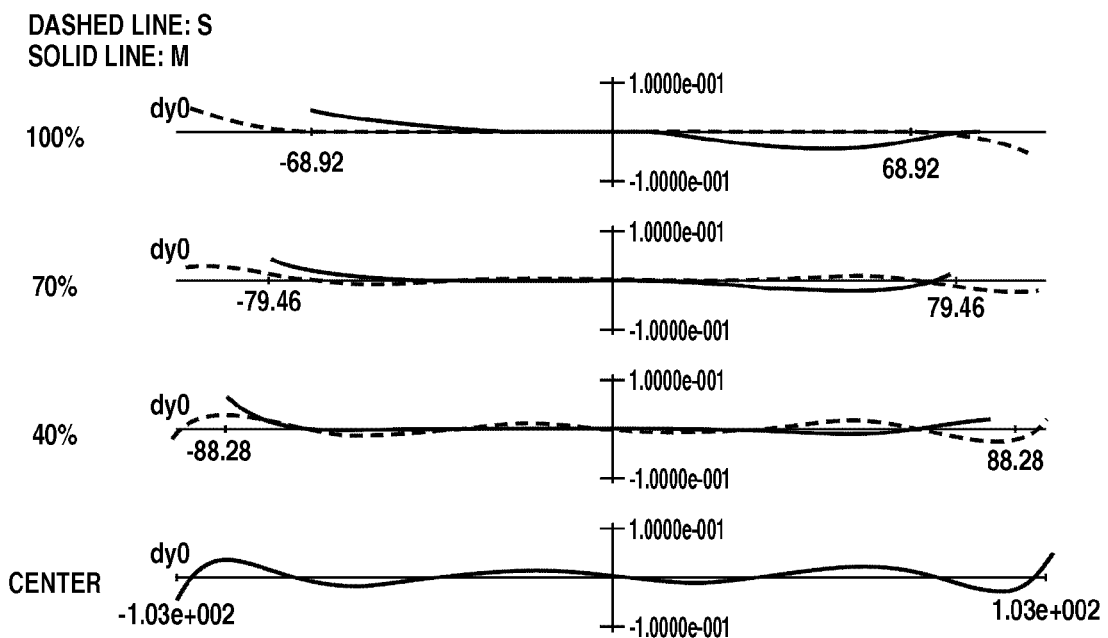
FIG. 19 illustrates lateral aberration diagrams of the zoom lens at the F-drop point according to the third exemplary embodiment of the present invention in the case where focusing is performed on an infinitely distant object.

FIG. 18 illustrates longitudinal aberration diagrams of the zoom lens at an F-drop point according to the third exemplary embodiment of the present invention in the case where focusing is performed on an infinitely distant object. FIG. 19 illustrates lateral aberration diagrams of the zoom lens at the F-drop point according to the third exemplary embodiment of the present invention in such a case.

Figure 20:
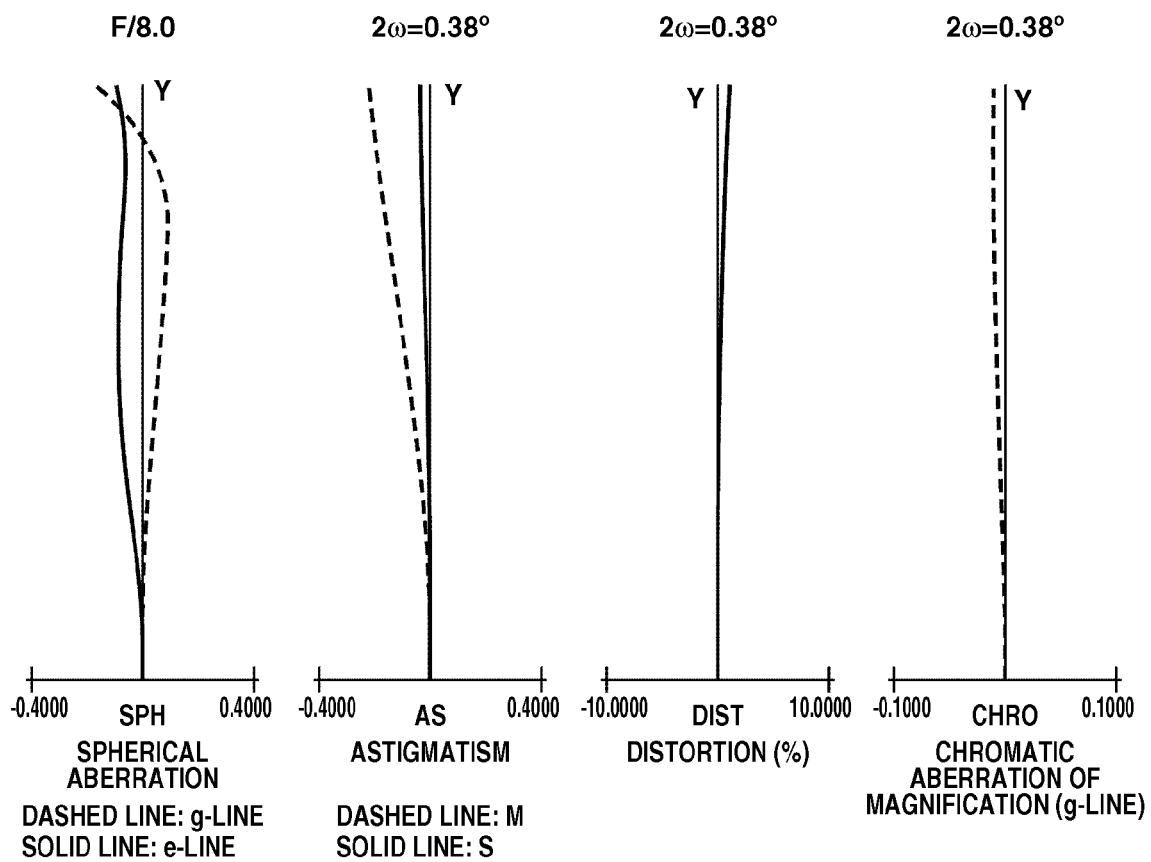
FIG. 20 illustrates longitudinal aberration diagrams of the zoom lens at the telephoto end according to the third exemplary embodiment of the present invention in the case where focusing is performed on an infinitely distant object.
Figure 21:
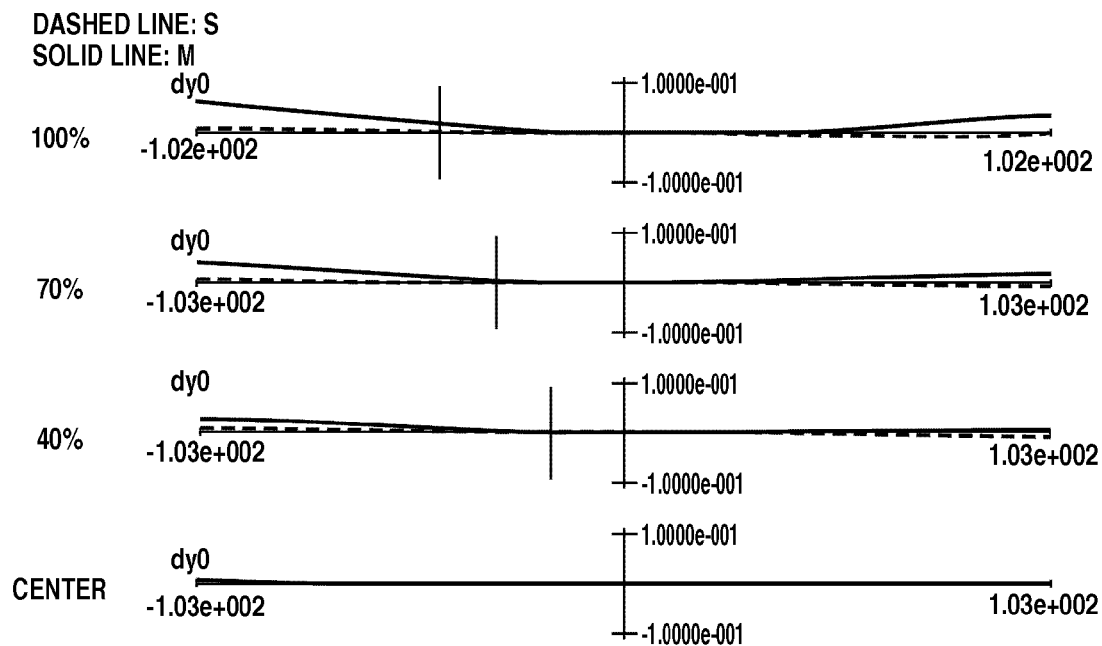
FIG. 21 illustrates lateral aberration diagrams of the zoom lens at the telephoto end according to the third exemplary embodiment of the present invention in the case where focusing is performed on an infinitely distant object.

FIG. 20 illustrates longitudinal aberration diagrams of the zoom lens at the telephoto end of the zooming range according to the third exemplary embodiment of the present invention in the case where focusing is performed on an infinitely distant object. FIG. 21 illustrates lateral aberration diagrams of the zoom lens at the telephoto end according to the third exemplary embodiment of the present invention in such a case.

Figure 22:
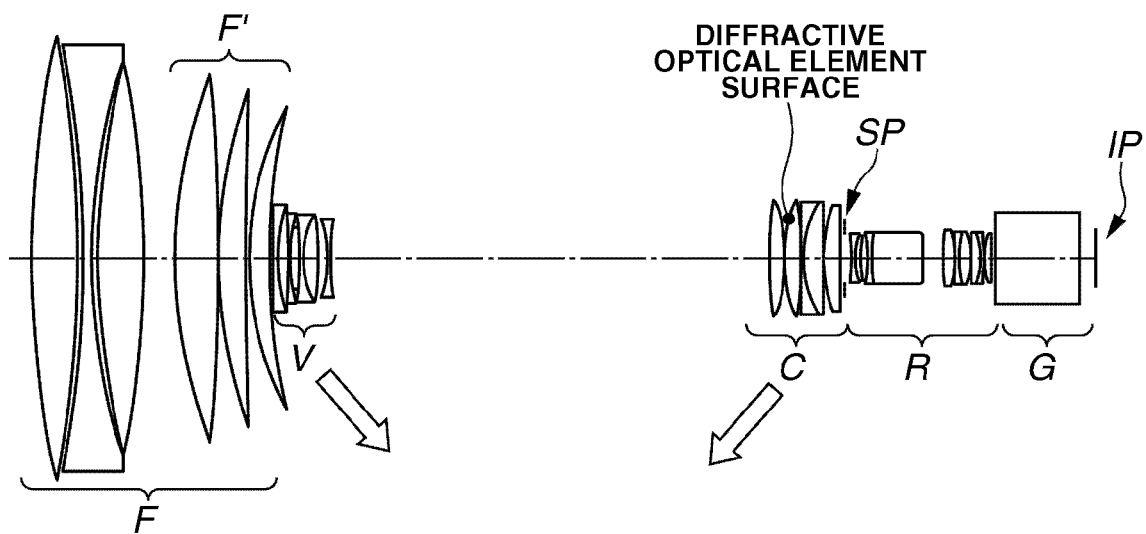
FIG. 22 is a cross-sectional view of a zoom lens according to a fourth exemplary embodiment of the present invention in the case where focusing is performed on an infinitely distant object.

FIG. 22 is a cross-sectional view of a zoom lens at the wide-angle end of the zooming range according to a fourth exemplary embodiment of the present invention.

Figure 23:
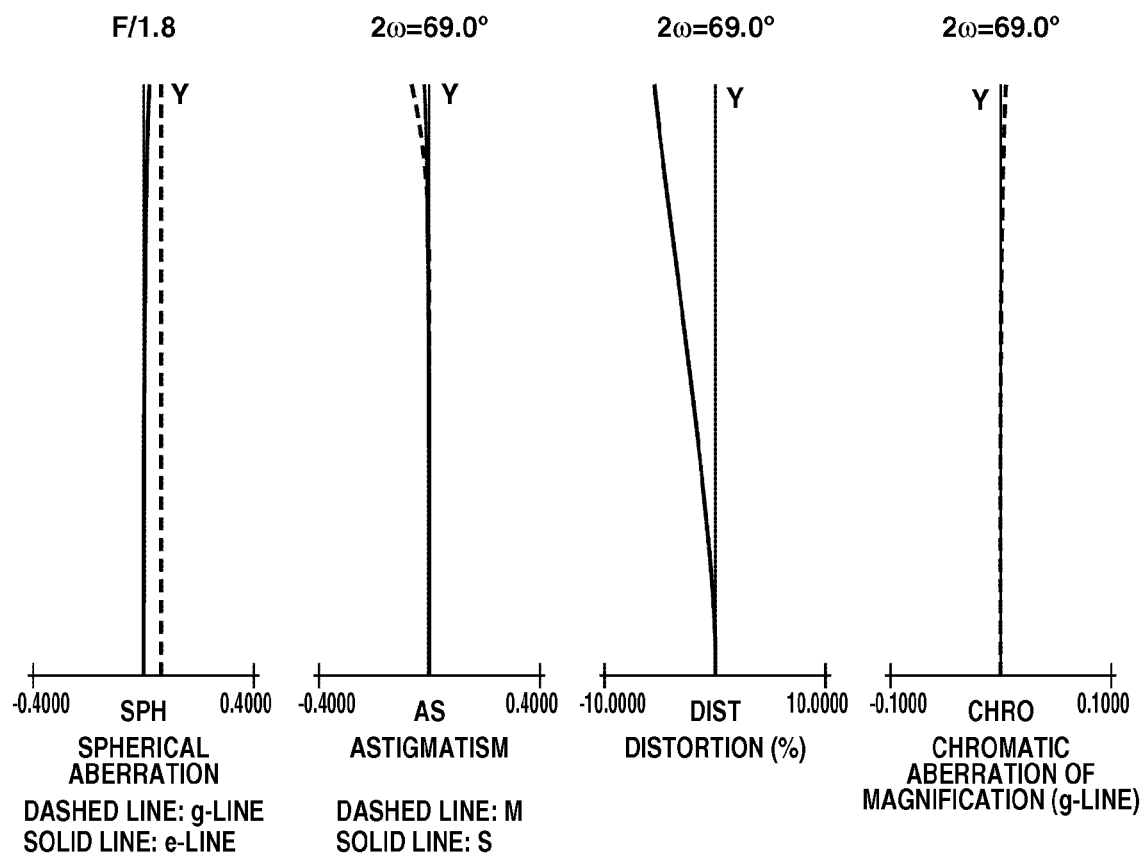
FIG. 23 illustrates longitudinal aberration diagrams of the zoom lens at the wide-angle end according to the fourth exemplary embodiment of the present invention in the case where focusing is performed on an infinitely distant object.
Figure 24:
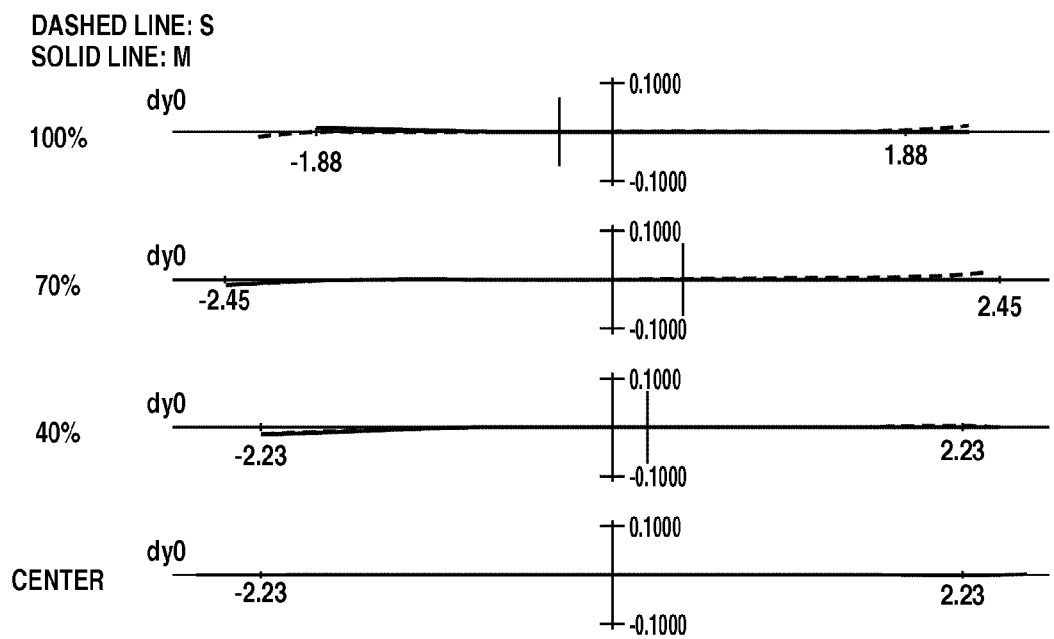
FIG. 24 illustrates lateral aberration diagrams of the zoom lens at the wide-angle end according to the fourth exemplary embodiment of the present invention in the case where focusing is performed on an infinitely distant object.

FIG. 23 illustrates longitudinal aberration diagrams of the zoom lens at the wide-angle end according to the fourth exemplary embodiment of the present invention in the case where focusing is performed on an infinitely distant object. FIG. 24 illustrates lateral aberration diagrams of the zoom lens at the wide-angle end according to the fourth exemplary embodiment of the present invention in such a case.

Figure 25:
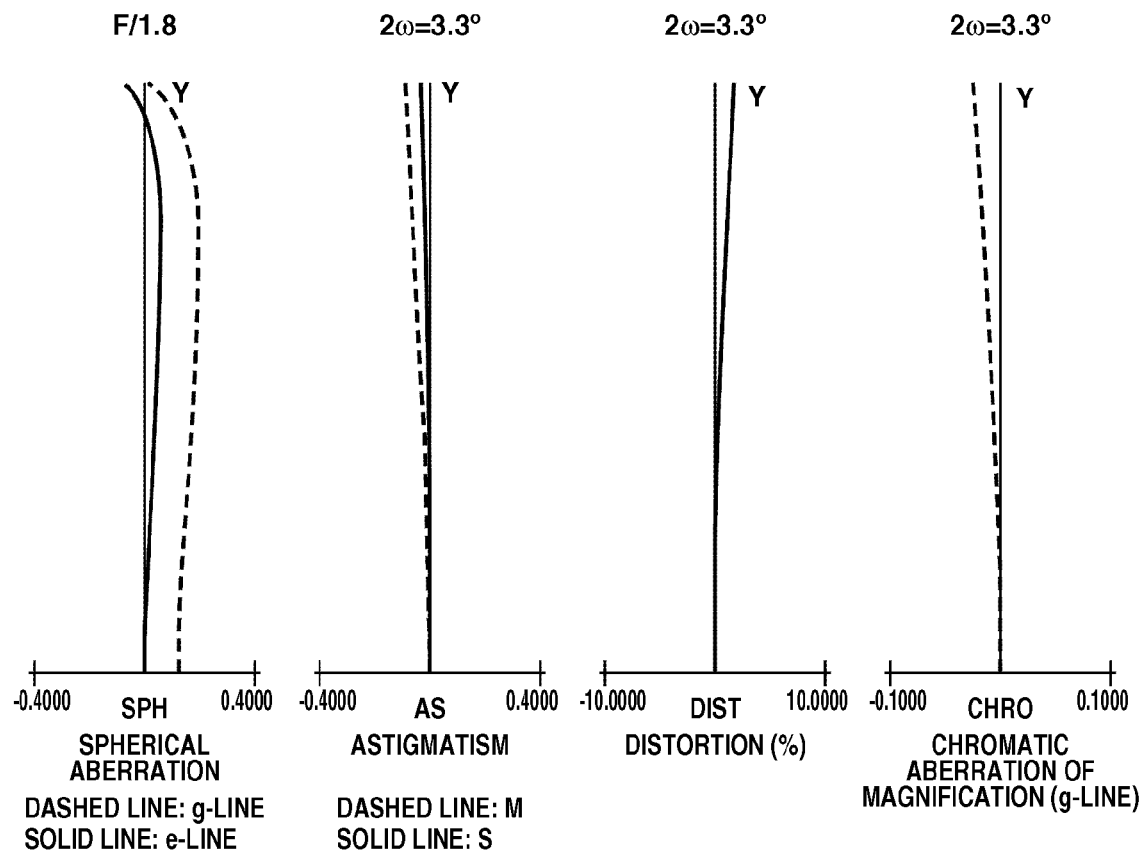
FIG. 25 illustrates longitudinal aberration diagrams of the zoom lens at an F-drop point according to the fourth exemplary embodiment of the present invention in the case where focusing is performed on an infinitely distant object.
Figure 26:
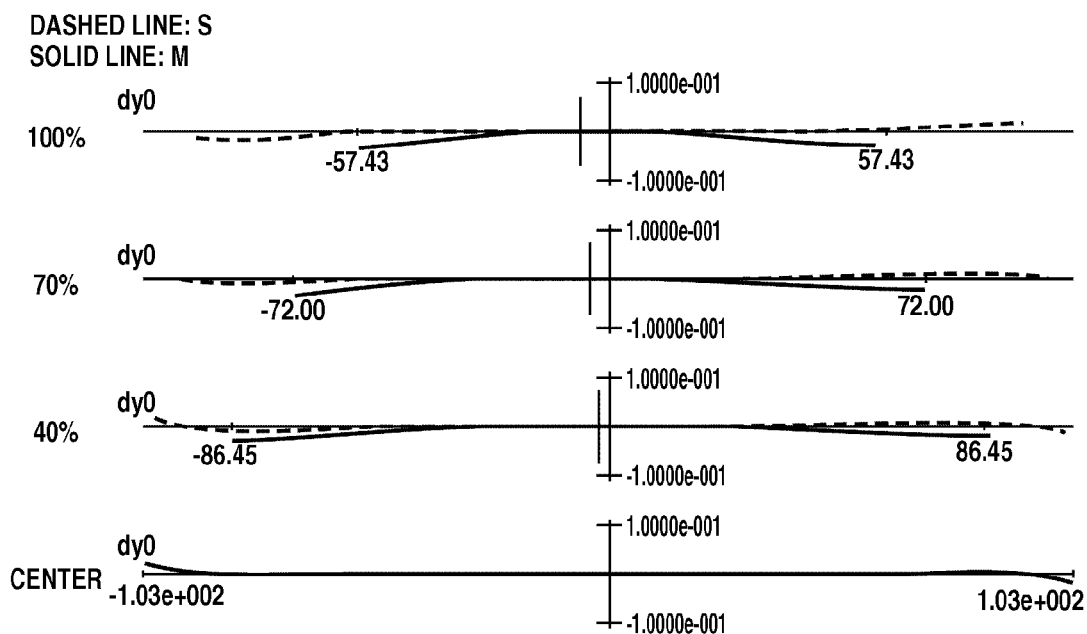
FIG. 26 illustrates lateral aberration diagrams of the zoom lens at the F-drop point according to the fourth exemplary embodiment of the present invention in the case where focusing is performed on an infinitely distant object.

FIG. 25 illustrates longitudinal aberration diagrams of the zoom lens at an F-drop point according to the fourth exemplary embodiment of the present invention in the case where focusing is performed on an infinitely distant object. FIG. 26 illustrates lateral aberration diagrams of the zoom lens at the F-drop point according to the fourth exemplary embodiment of the present invention in such a case.

Figure 27:
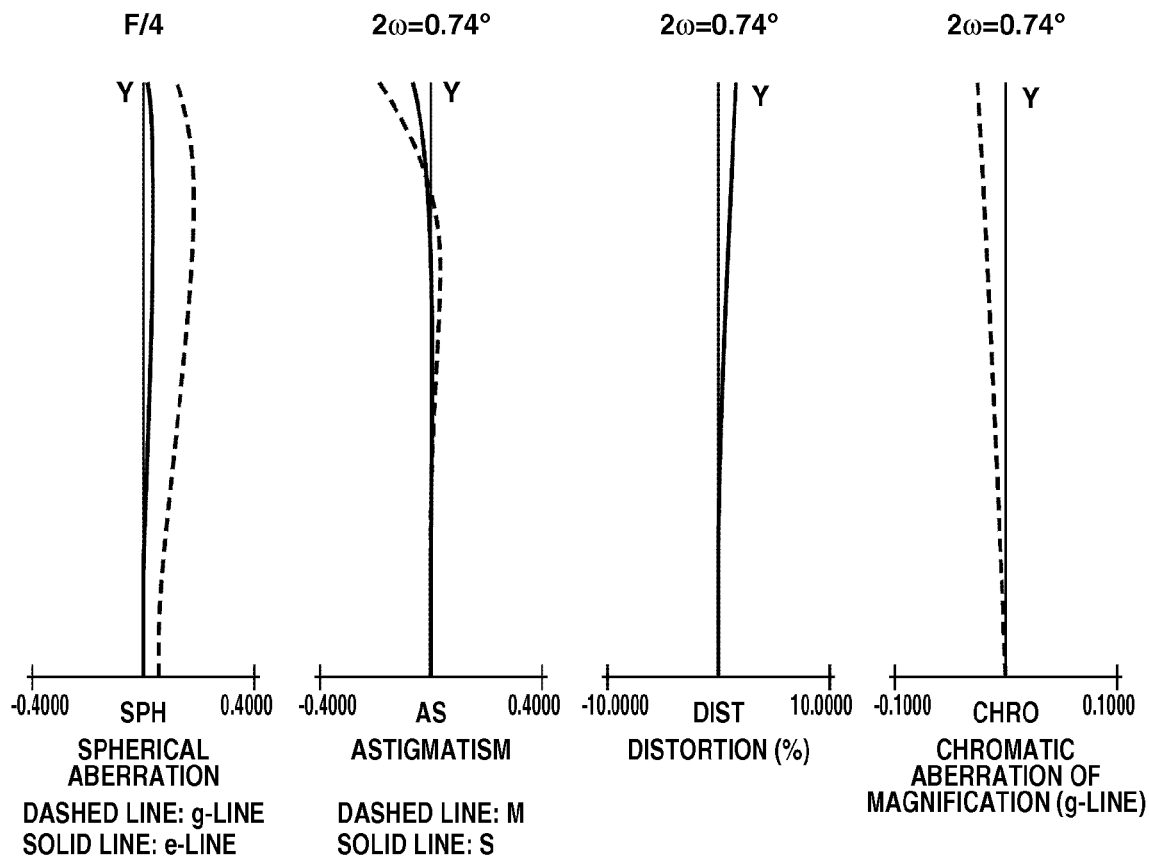
FIG. 27 illustrates longitudinal aberration diagrams of the zoom lens at the telephoto end according to the fourth exemplary embodiment of the present invention in the case where focusing is performed on an infinitely distant object.
Figure 28:
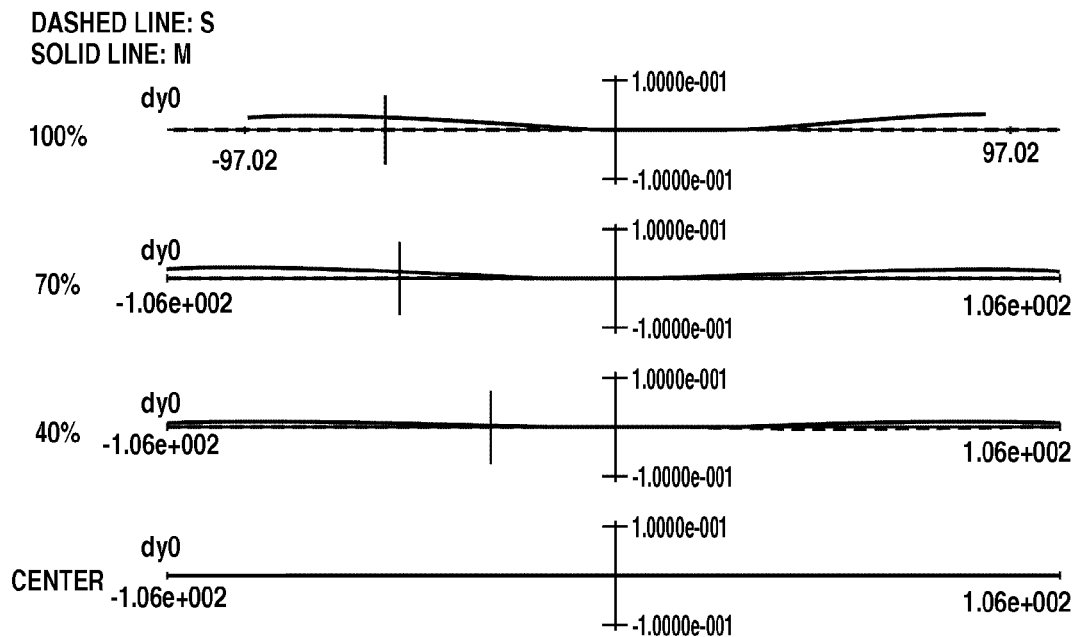
FIG. 28 illustrates lateral aberration diagrams of the zoom lens at the telephoto end according to the fourth exemplary embodiment of the present invention in the case where focusing is performed on an infinitely distant object.

FIG. 27 illustrates longitudinal aberration diagrams of the zoom lens at the telephoto end of the zooming range according to the fourth exemplary embodiment of the present invention in the case where focusing is performed on an infinitely distant object. FIG. 28 illustrates lateral aberration diagrams of the zoom lens at the telephoto end according to the fourth exemplary embodiment of the present invention in such a case.

Figure 29:
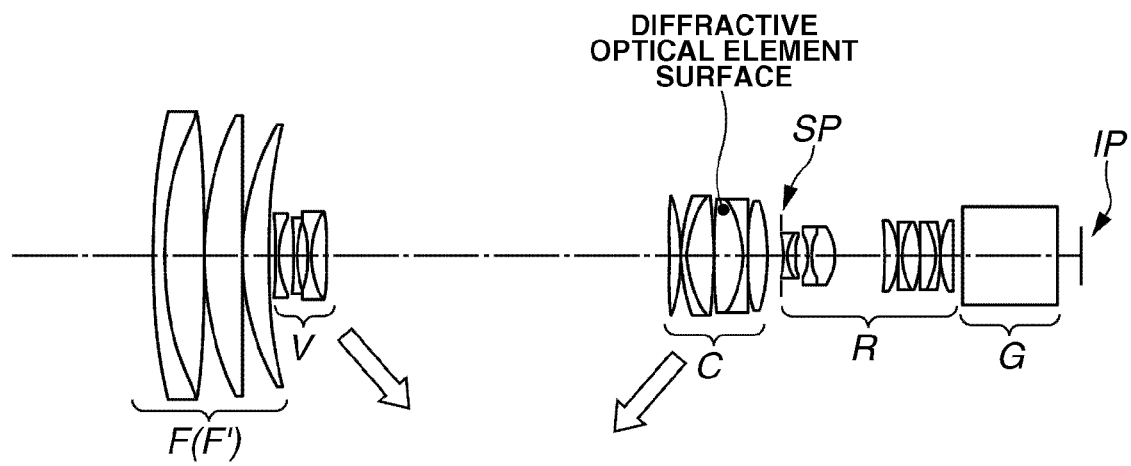
FIG. 29 is a cross-sectional view of a zoom lens according to a fifth exemplary embodiment of the present invention in the case where focusing is performed on an infinitely distant object.

FIG. 29 is a cross-sectional view of a zoom lens at the wide-angle end of the zooming range according to a fifth exemplary embodiment of the present invention.

Figure 30:
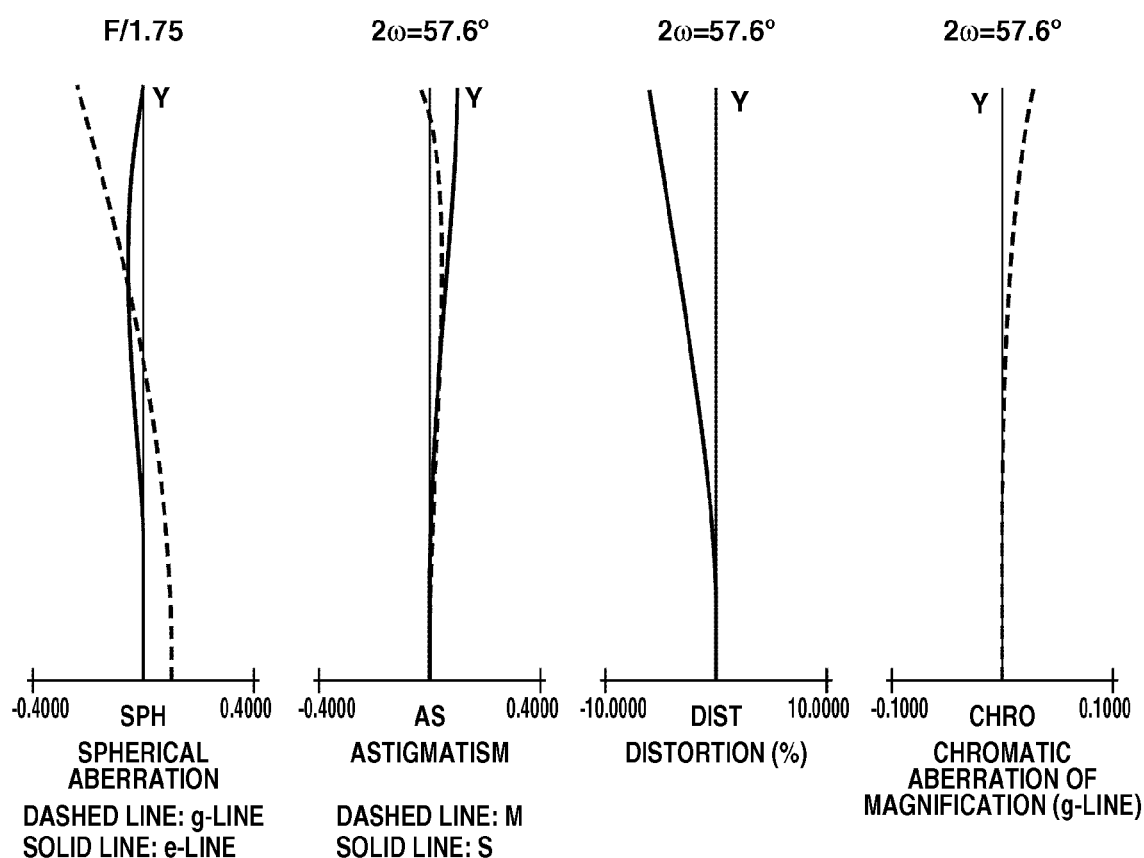
FIG. 30 illustrates longitudinal aberration diagrams of the zoom lens at the wide-angle end according to the fifth exemplary embodiment of the present invention in the case where focusing is performed on an infinitely distant object.
Figure 31:
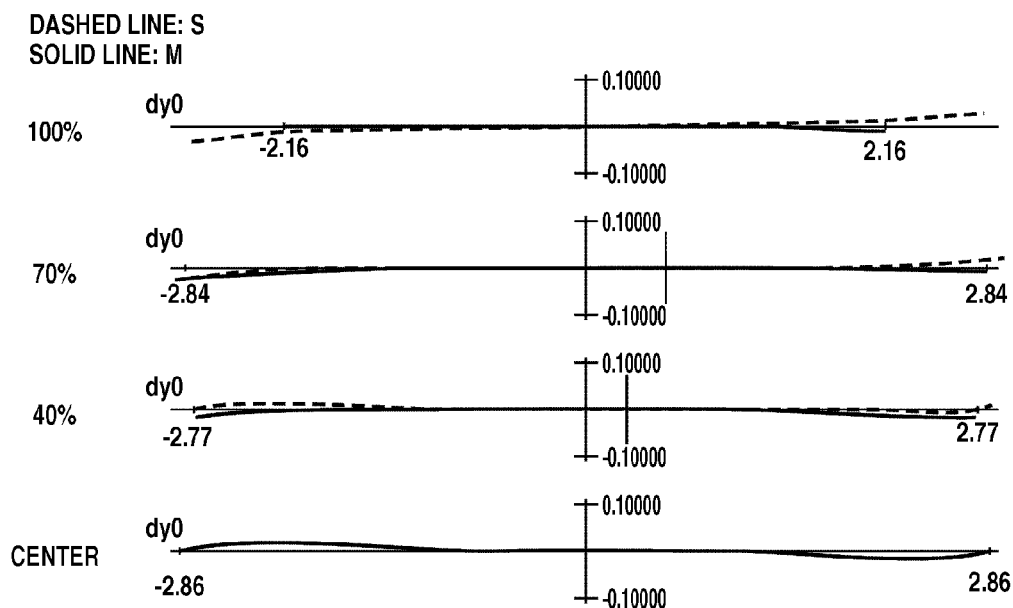
FIG. 31 illustrates lateral aberration diagrams of the zoom lens at the wide-angle end according to the fifth exemplary embodiment of the present invention in the case where focusing is performed on an infinitely distant object.

FIG. 30 illustrates longitudinal aberration diagrams of the zoom lens at the wide-angle end according to the fifth exemplary embodiment of the present invention in the case where focusing is performed on an infinitely distant object. FIG. 31 illustrates lateral aberration diagrams of the zoom lens at the wide-angle end according to the fifth exemplary embodiment of the present invention in such a case.

Figure 32:
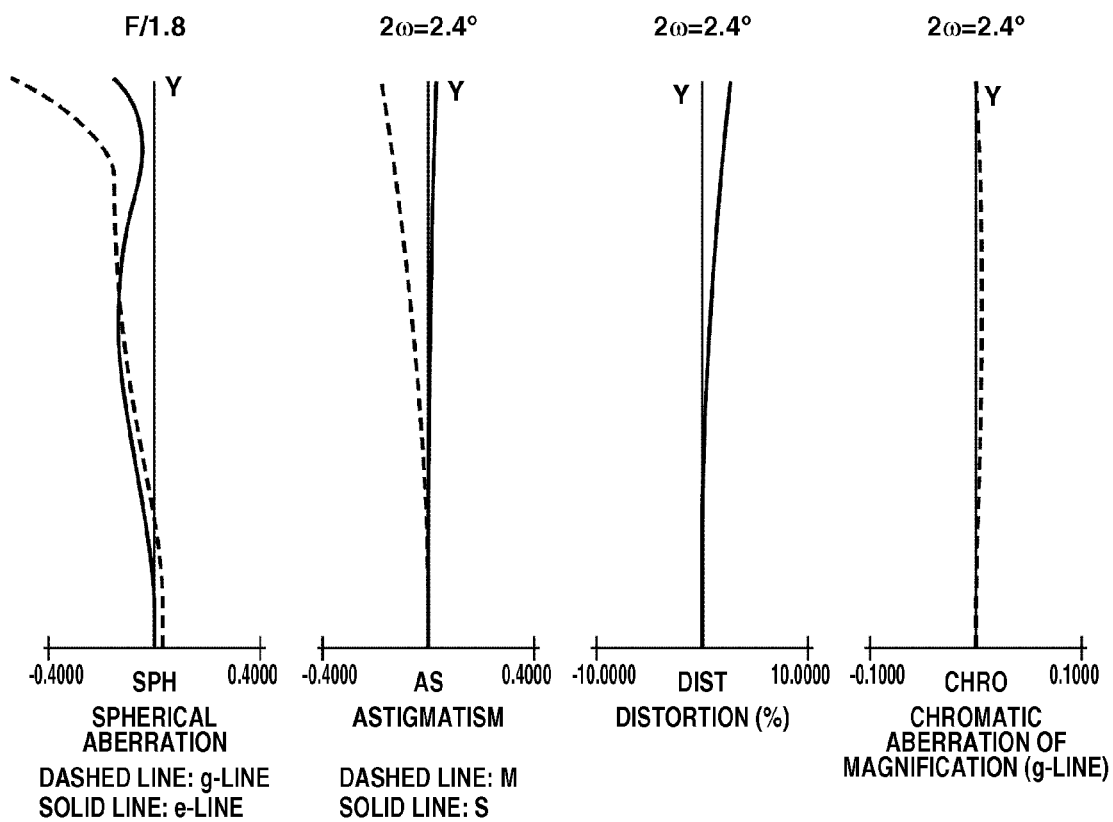
FIG. 32 illustrates longitudinal aberration diagrams of the zoom lens at an F-drop point according to the fifth exemplary embodiment of the present invention in the case where focusing is performed on an infinitely distant object.
Figure 33:
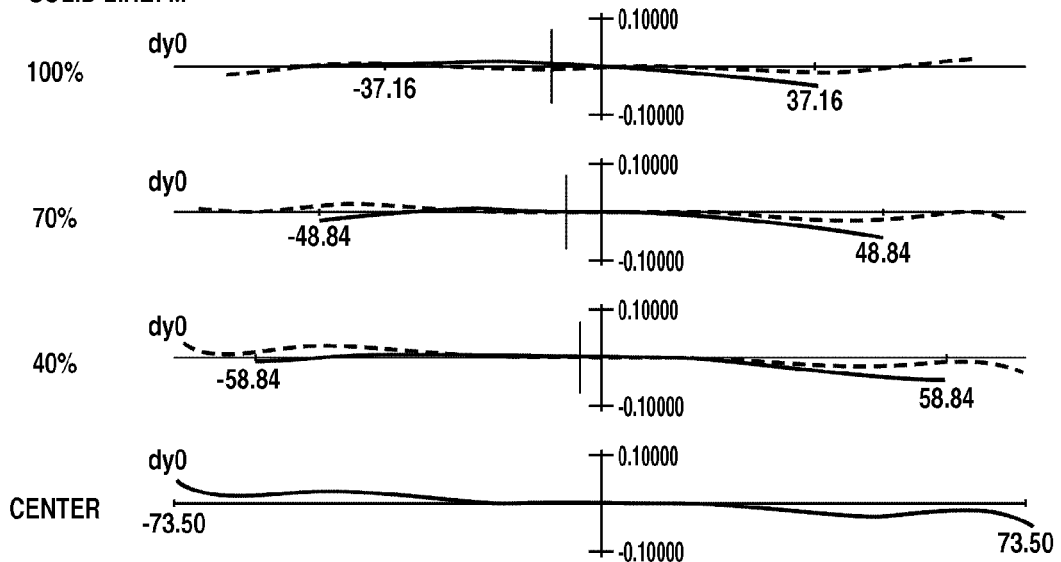
FIG. 33 illustrates lateral aberration diagrams of the zoom lens at the F-drop point according to the fifth exemplary embodiment of the present invention in the case where focusing is performed on an infinitely distant object.

FIG. 32 illustrates longitudinal aberration diagrams of the zoom lens at an F-drop point according to the fifth exemplary embodiment of the present invention in the case where focusing is performed on an infinitely distant object. FIG. 33 illustrates lateral aberration diagrams of the zoom lens at the F-drop point according to the fifth exemplary embodiment of the present invention in such a case.

Figure 34:
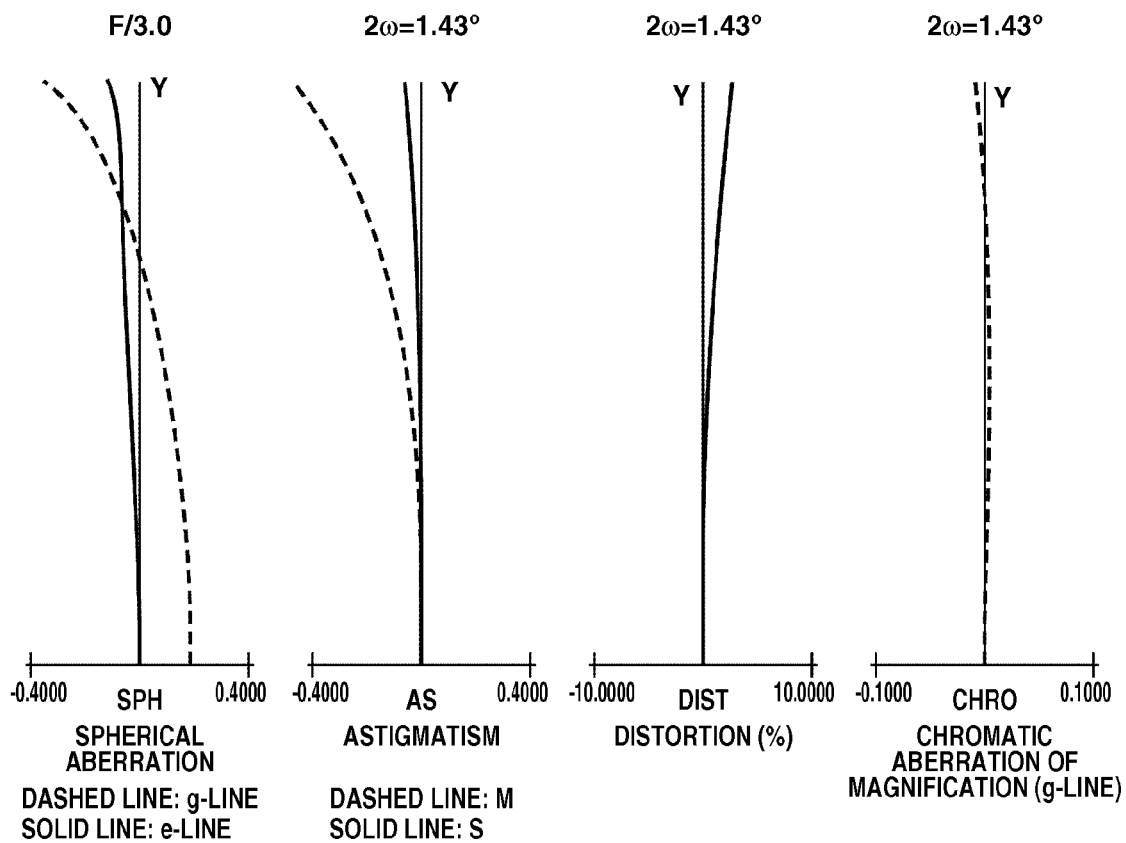
FIG. 34 illustrates longitudinal aberration diagrams of the zoom lens at the telephoto end according to the fifth exemplary embodiment of the present invention in the case where focusing is performed on an infinitely distant object.
Figure 35:
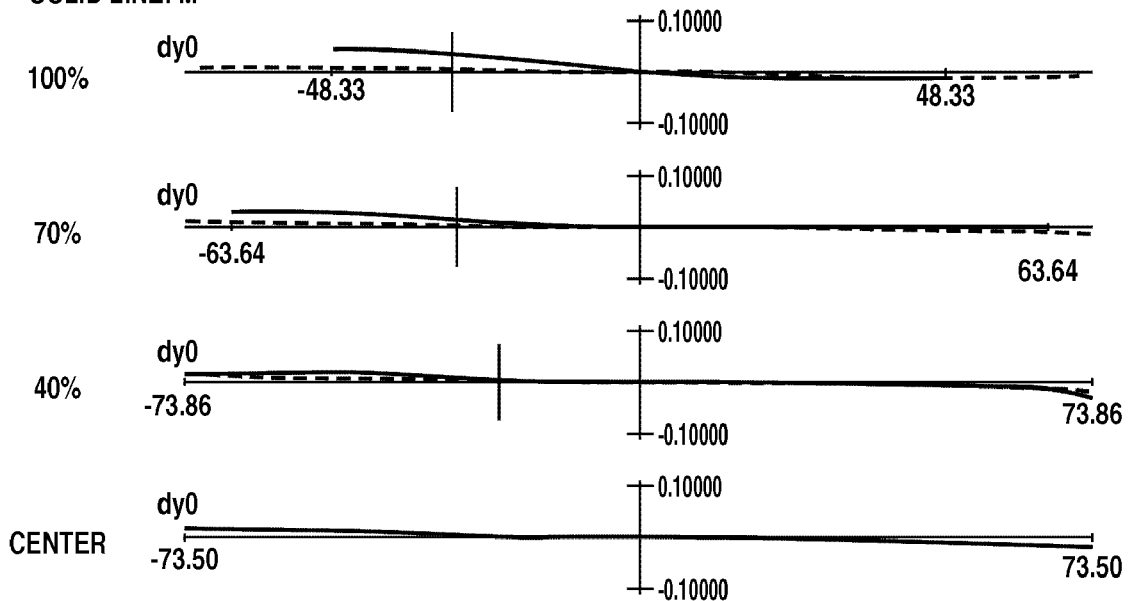
FIG. 35 illustrates lateral aberration diagrams of the zoom lens at the telephoto end according to the fifth exemplary embodiment of the present invention in the case where focusing is performed on an infinitely distant object.

FIG. 34 illustrates longitudinal aberration diagrams of the zoom lens at the telephoto end according to the fifth exemplary embodiment of the present invention in the case where focusing is performed on an infinitely distant object. FIG. 35 illustrates lateral aberration diagrams of the zoom lens at the telephoto end according to the fifth exemplary embodiment of the present invention in such a case.

Figure 36:
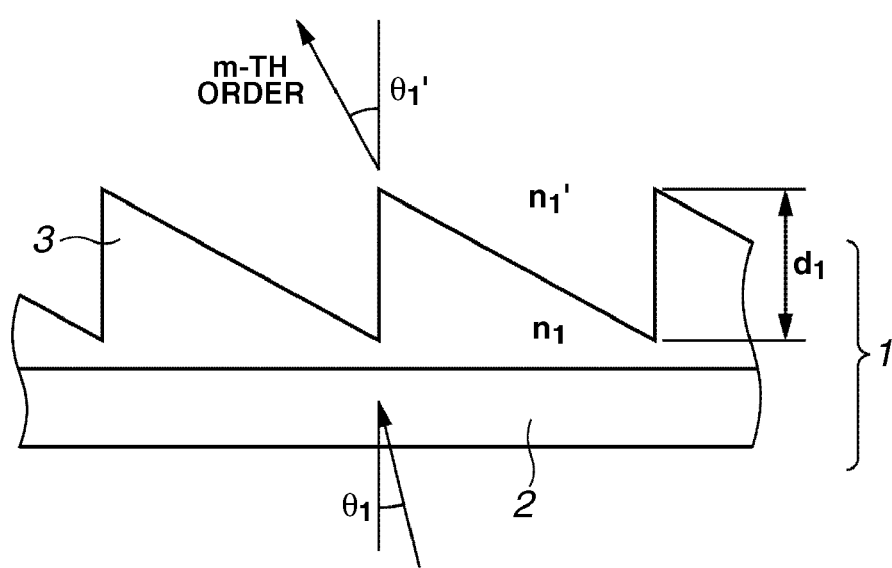
FIG. 36 is a cross-sectional view of a diffractive optical element of a single-layer structure according to an exemplary embodiment of the present invention.

FIG. 36 is a cross-sectional view of a diffractive optical element according to an exemplary embodiment of the present invention.

Figure 37:
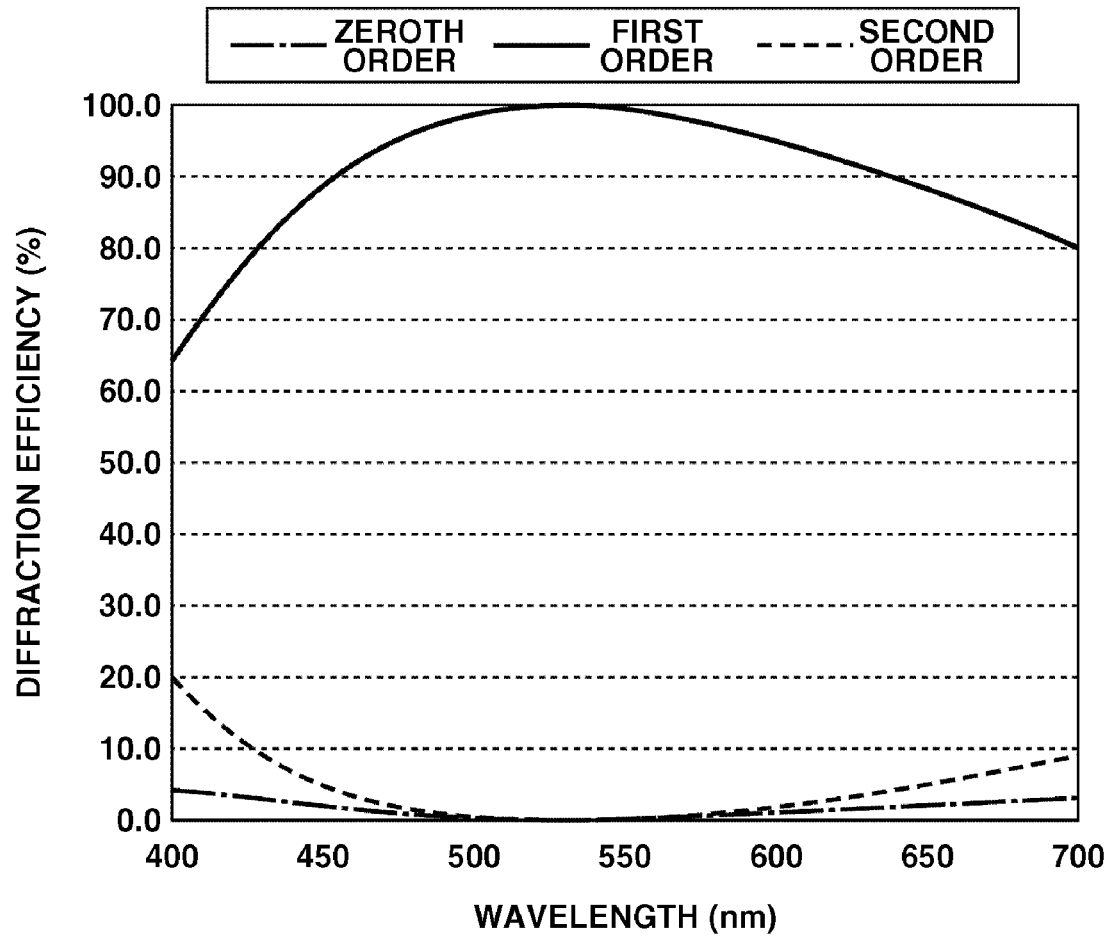
FIG. 37 illustrates the wavelength dependency of the diffraction efficiency of the diffractive optical element of a single-layer structure according to an exemplary embodiment of the present invention.

FIG. 37 illustrates wavelength dependency of a diffraction efficiency of the diffractive optical element according to an exemplary embodiment of the present invention.

Figure 38:
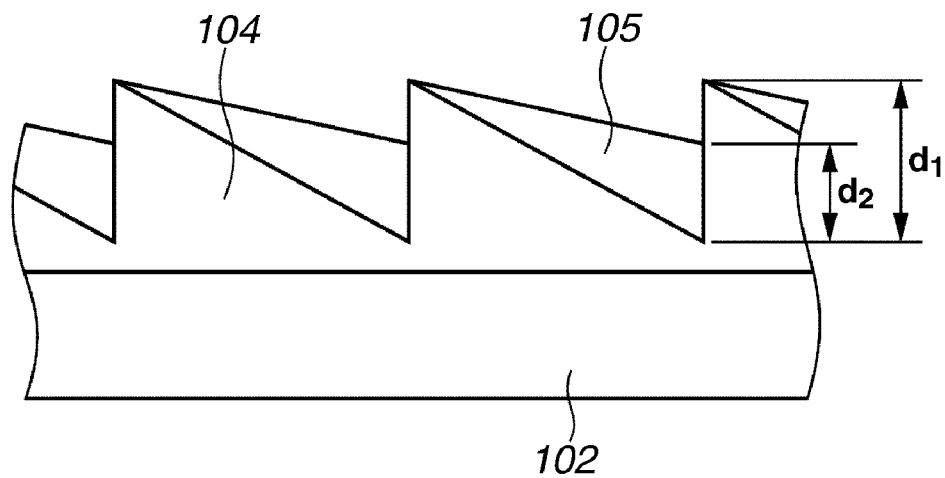
FIG. 38 is a cross-sectional view of a diffractive optical element having a laminated structure according to an exemplary embodiment of the present invention.

FIG. 38 is a cross-sectional view of a diffractive optical element according to an exemplary embodiment of the present invention.

Figure 39:
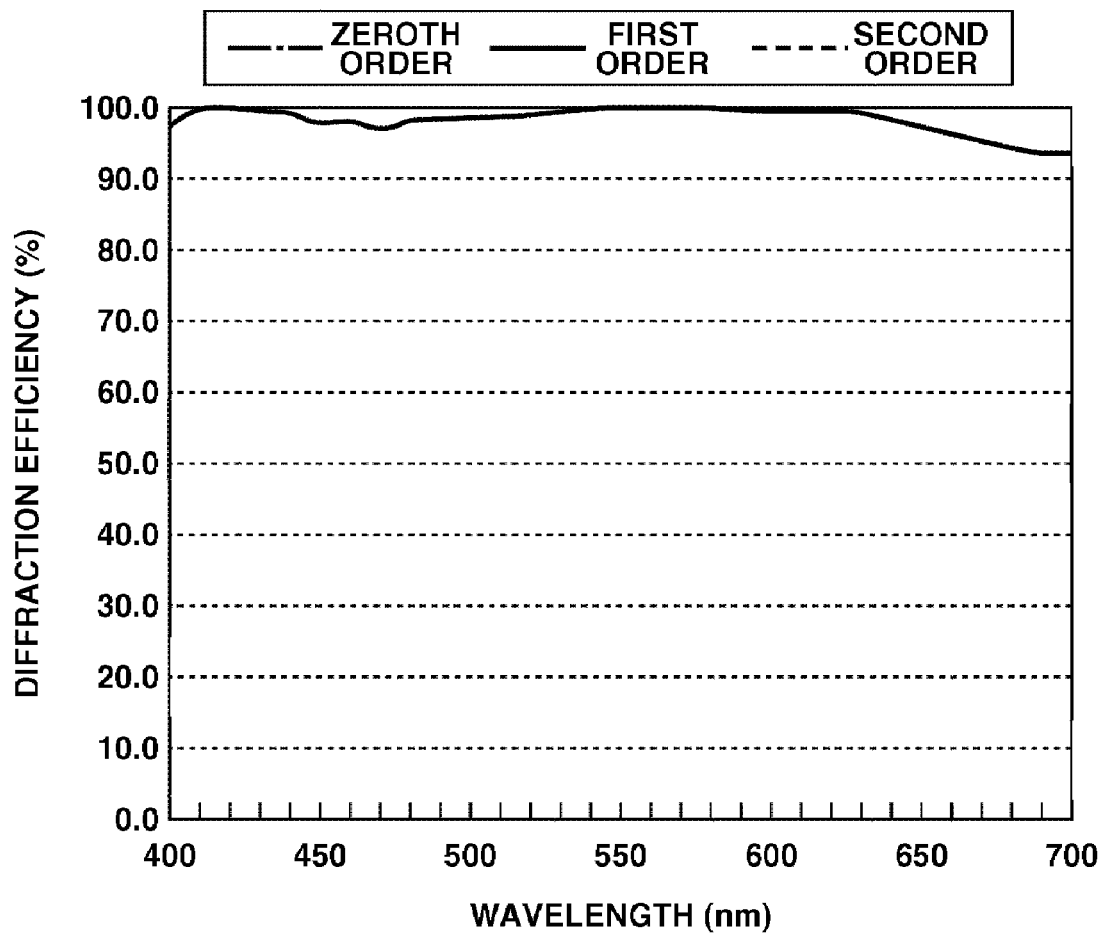
FIG. 39 illustrates wavelength dependency of the diffraction efficiency of the diffractive optical element of the laminated structure according to an exemplary embodiment of the present invention.

FIG. 39 illustrates wavelength dependency of a diffraction efficiency of this diffractive optical element according to an exemplary embodiment of the present invention.

Figure 40:
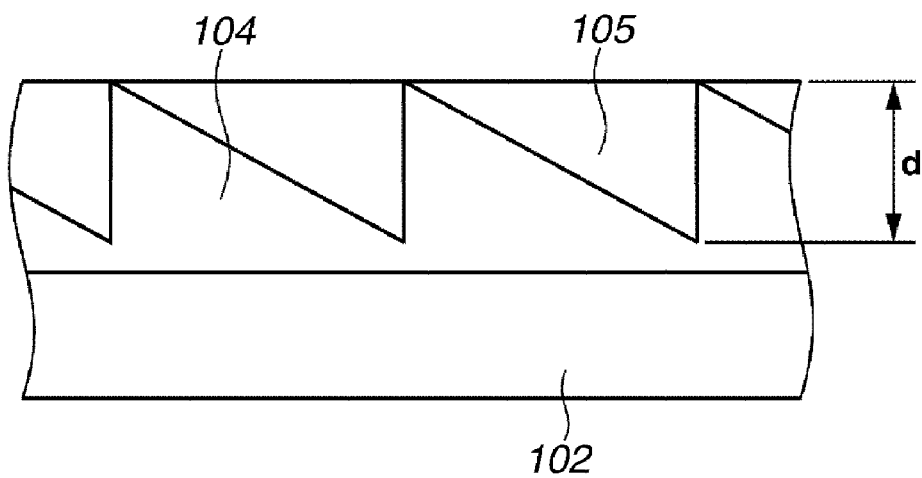
FIG. 40 is a cross-sectional view of a diffractive optical element according to an exemplary embodiment of the present invention.

FIG. 40 is a cross-sectional view of a diffractive optical element according to an exemplary embodiment of the present invention.

Figure 41:
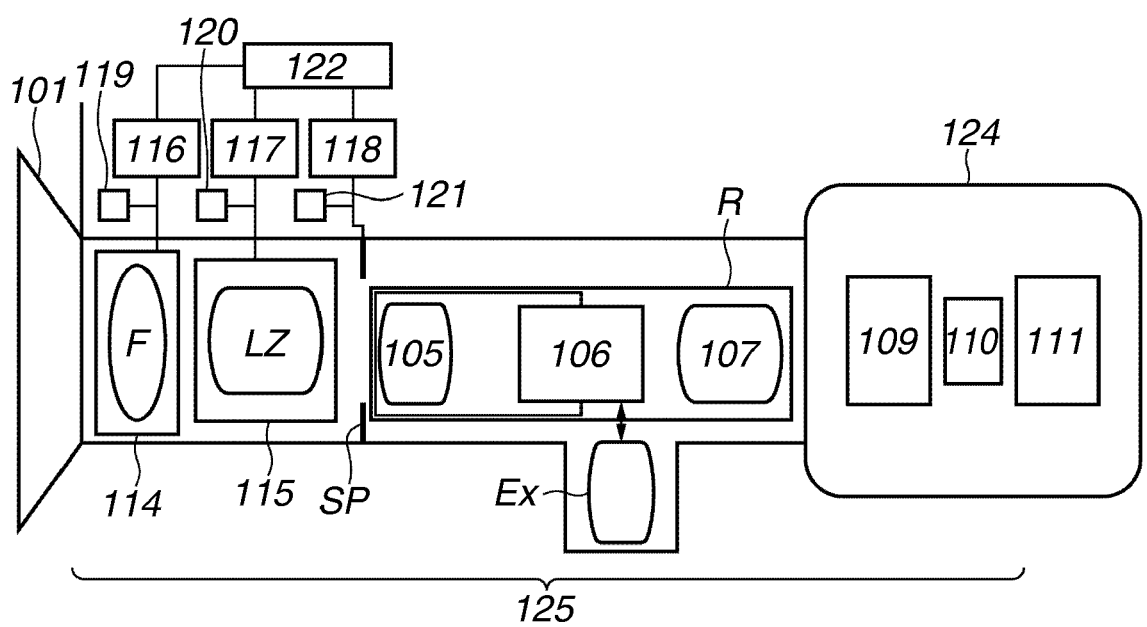
FIG. 41 illustrates an image pickup apparatus according to an exemplary embodiment of the present invention.

FIG. 41 schematically illustrates an image pickup apparatus according to an exemplary embodiment of the present invention.

In each of the cross-sectional views of the zoom lenses, the first lens unit F having a positive refractive power is stationary during zooming, the second lens unit (variator lens unit for varying magnification) V having a negative refractive power is movable during zooming, the third lens unit (compensator lens unit) C having a positive refractive power for compensating for variation of an image plane due to magnification variation is movable during zooming.

An aperture stop SP is located at the image side of the third lens unit C. The fourth lens unit (relay lens unit) R serves to form an image of an object. A glass block G serves as a color separation prism or an optical filter. An image plane IP corresponds to an imaging plane of a solid-state image sensor (photoelectric conversion element).

In each of the aberration diagrams, curves g and e represent g-line and e-line light, respectively. Curves M and S correspond to a meridional image plane and a sagittal image plane, respectively. Chromatic aberration of magnification is represented with g-line light. The Y-axis in the spherical aberration's graph represents an entrance pupil radius at a predetermined f-number Fno. The Y-axis in the astigmatism's, distortion's and chromatic aberration of magnification's graphs represents an image height at a predetermined half angle of view ω.

In the aberration diagrams, the abscissa axis indicating spherical aberration is represented with a scale of 0.4 mm. The abscissa axis indicating astigmatism is represented with a scale of 0.4 mm. The abscissa axis indicating distortion is represented with a scale of 10%. The abscissa axis indicating lateral aberration is represented with a scale of 0.1 mm.

In the following description of each exemplary embodiment, the terms "wide-angle end" and "telephoto end" designate zoom positions respectively corresponding to both ends of a range in which the second lens unit V for varying magnification can mechanically move along an optical axis.

Next, features of each exemplary embodiment are described below.

The first lens unit F has a refractive power for focusing. Focusing is performed by moving a lens unit F' having a refractive power, which can be either the whole first lens unit or only a part of the first lens unit F.

In the first to fourth exemplary embodiments, focusing from an infinitely distant object up to a short distant object is performed by moving the lens unit F', which is a part of the first lens unit F, to the object side. In the fifth exemplary embodiment, focusing from an infinitely distant object up to a short distant object is performed by moving the entire first lens unit F (the lens unit F') to the object side.

The second lens unit V moves monotonically towards the image side along the optical axis, as indicated by an arrow, to vary magnification from a wide-angle end to a telephoto end.

The third lens unit C moves in a non-linear fashion towards the object side, as indicated by an arrow, when magnification is changed from a wide-angle end to a telephoto end. Thus, variation of an image plane due to magnification variation is compensated for.

In each exemplary embodiment, the second lens unit V and the third lens unit C constitute a magnification variation lens unit (magnification variation portion). The distance between the second lens unit V and the third lens unit C decreases during zooming from the wide-angle end to the telephoto end. Both the second lens unit V and the third lens unit C simultaneously use a zoom area in which an image-forming magnification of (−1) (equi-magnification) is included.

Thus, by employing this type of zooming, both the second lens unit V and the third lens unit C can greatly contribute to the variation of magnification. A high zoom ratio of 40 or more can be achieved at a small movement distance of the lens units V and C.

To reduce the size of the entire lens system and to achieve a high zoom ratio, it is effective to increase the contribution of the third lens unit C to the variation of magnification. However, characteristics of the third lens unit C greatly affect the variation of aberration over the entire zoom area.

Generally, the zoom lens of the above-described zooming type is permitted to reduce F-number at a zoom position corresponding to the telephoto end thereof so as to reduce the size of the entire lens system. Hereinafter, a focal position (or focal length), at which the F-number starts to decrease, in a zooming range is referred to an "F-drop point".

Generally, a focal length (fd) corresponding to the F-drop point is approximately given by the following expression:

$$fd = (FW/FT) \cdot fT$$

where FW represents F-number of the entire zoom lens at the wide-angle end, FT denotes F-number of the entire zoom lens at the telephoto end, and fT designates a focal length of the entire zoom lens at the telephoto end.

In each exemplary embodiment, the lens unit F does not move to perform zooming. During zooming from the wide-angle end to the telephoto end, the second lens unit V moves monotonically towards the object side, and the third lens unit C moves towards the object side. In this case, an on-axis light ray and an off-axis light ray, which are incident on the third lens unit C, change in the following manner during zooming.

The height of an axial marginal light ray, which is incident on the third lens unit C, is gradually increased, as the distance between the second lens unit V and the third lens unit C is decreased during zooming from the wide-angle end to the telephoto end. The height of the axial marginal light ray has a maximum value at the F-drop point. Subsequently, as the zoom lens is focused to a further telephoto end side, the height of the axial marginal light ray gradually decreases.

Thus, generally, axial chromatic aberration and spherical aberration have a tendency towards extreme deterioration in the vicinity of the F-drop point. Additionally, in a range from the F-drop point to the telephoto end, the magnification varying rate increases markedly. Thus, axial chromatic aberration and spherical aberration have a tendency towards further deterioration.

During zooming from the wide-angle end to the telephoto end, the third lens unit C does not move much away from the stop SP. Thus, the height of an off-axis marginal light ray, which forms an image at a maximum image height, is small.

Accordingly, the effect of the third lens unit C on chromatic aberration of magnification among various kinds of chromatic aberration over the entire zooming range is relatively low, as compared with the other lens units.

However, during zooming from the wide-angle end to the telephoto end, an off-axis light flux to be incident on the third lens unit C is incident thereupon such that the width of the incident off-axis light flux is nearly equal to the width of an incident axial light flux, while the incident angle thereof is always changed by the lens unit V. Accordingly, the third lens unit C greatly affects variation of halo and coma aberration in addition to the variation of spherical aberration.

To achieve a high zoom ratio and high optical performance in the zoom lens of the above-described zooming type, it is important to appropriately set the lens configuration of the third lens unit C, for example, the shape and the refractive power (optical power) of each of lens elements of the third lens unit C.

In each exemplary embodiment, the lens elements constituting the third lens unit C include at least one or more positive lenses, one or more negative lens, and one or more diffractive optical elements, and satisfy the following conditions.

A focal length (fc) of the third lens unit C, a focal length (fdoe) of the diffractive optical element, a focal length (fW) at the wide angle end of the entire zoom lens, and a focal length (fT) at the telephoto end thereof satisfy the following conditions:

$$0.35 < fc/\sqrt{(fW \cdot fT)} < 0.81 \quad (1), \text{ and}$$

$$45 < fdoe/fc < 300 \quad (2).$$

The "diffraction portion" in each exemplary embodiment designates one or more diffractive gratings provided on a substrate (flat plate or lens). The "diffractive optical element" designates an element obtained by providing a diffraction portion including one or more diffraction gratings on a substrate (flat plate or lens).

A refractive power (power=a reciprocal of a focal length) $\phi D$ of a diffraction portion is obtained as follows.

The shape of the diffraction grating of the diffraction portion is represented by the following expression:

$$\phi(h) = (2\pi/\lambda d) \cdot (C2 \cdot h^2 + C4 \cdot h^4 + \ldots C2 i \cdot h^{2i}) \quad (a)$$

where "$\lambda d$" designates a reference wavelength (d-line light), "h" designates a distance from an optical axis, "$\phi(h)$" denotes a phase, and "i" represents a natural number. The refractive power $\phi D$ of the diffraction portion is obtained by quadratic approximation. Thus, the refractive power $\phi D$ is given by the following expression using the coefficient C2 of a quadratic term:

$$\phi D = -2 \cdot C2.$$

Thus, the focal length (fdoe) of the diffractive optical element is represented by the following expression:

$$fdoe = -1/(2 \cdot C2).$$

In a case where the lens elements constituting the third lens unit C do not include one or more positive lenses and one or more negative lenses, a burden of aberration correction to be placed on each single lens element is increased. Consequently, even in a case where anomalous dispersion glass, an aspherical optical element, or a diffractive optical element is used, it is difficult to eliminate the factors contributing to the deterioration of various aberrations.

The condition (1) regulates a focal length of the third lens unit C, in which the diffractive optical element is provided, to be within an appropriate range of the following focal length fm featuring the zoom lens:

$$fm = \sqrt{(fW \cdot fT)}.$$

In a case where the upper limit of the condition (1) is exceeded, the refractive power of the third lens unit C is too small. When a predetermined zoom ratio is achieved, the total length of the zoom lens is too long.

In a case where the lower limit of the condition (1) is exceeded, the refractive power of the third lens unit C is too large. Spherical aberration is increased in the vicinity of the above-described F-drop point and at the telephoto end. Moreover, it is difficult to correct spherical aberration due to zooming, halo and coma aberration.

The condition (2) regulates the power of the diffraction portion of the diffractive optical element of the third lens unit C within an appropriate range with respect to the focal length of the third lens unit C.

In a case where the upper limit of the condition (2) is exceeded, and the refractive power of the diffraction portion of the third lens unit C becomes small, it is difficult to correct axial chromatic aberration at the telephoto side from the F-drop point. This is a disadvantage, because it necessitates the use of low-dispersion glass or anomalous dispersion glass as the glass material of the positive lens element constituting the third lens unit C.

These glass materials have small refractive indexes. Thus, it is difficult to correct the variation of aberration due to zooming other than the above-described chromatic aberrations over the zooming range. Particularly, it is difficult to configure the third lens unit C such that the third lens unit C provides an appropriate refractive power within a range according to the condition (1).

For example, even when a lens made of anomalous dispersion glass is used in a zoom lens having a high zoom ratio that is equal to or more than 40, when the upper limit of the condition (2) is exceeded, the remaining secondary spectrum corresponding to axial chromatic aberration increases at the telephoto end.

In a case where the lower limit of the condition (2) is exceeded, and the refractive power of the diffraction portion included in the third lens unit C becomes large, correction for axial chromatic aberration is excessive over the entire zooming range in addition to the telephoto end.

This is understood in consideration of the following example of a system obtained by generalizing an optical system including a positive lens, a negative lens and a diffractive optical element.

Generally, axial chromatic aberration caused by an optical system including a diffractive optical element is represented by the following expressions in a case where the optical system is constituted by thin optical elements:

$$L = 1/(fp \cdot vpe) + 1/(fn \cdot vne) + 1/(fdoe \cdot vdoe) \quad (10a)$$

$$vpe = (Npe-1)/(Npf-Npc) \quad (10b)$$

$$vne = (Nne-1)/(Nnf-Nnc) \quad (10c)$$

$$vdoe = \lambda e/(\lambda f - \lambda c) = -3.20 \quad (10d)$$

$$1/f = 1/fp + 1/fn + 1/fdoe \quad (10e)$$

where L is an axial chromatic aberration coefficient,
f is a focal length of the entire optical system,
fp is a focal length of the positive lens of the optical system,
fn is a focal length of the negative lens of the optical system,
fdoe is a focal length of the diffraction portion,
vpe is a dispersion value of the material of the positive lens of the optical system,
vne is a dispersion value of the material of the negative lens of the optical system,
vdoe is a dispersion value of the material of the diffraction portion,
Npe is a refractive index on an optical axis of the positive lens in the optical system for e-line light having a wavelength $\lambda e$,
Npf is a refractive index on an optical axis of the positive lens in the optical system for f-line light having a wavelength $\lambda f$,
Npc is a refractive index on an optical axis of the positive lens in the optical system for c-line light having a wavelength $\lambda c$,
Nne is a refractive index on an optical axis of the negative lens in the optical system for e-line light having a wavelength $\lambda e$,
Nnf is a refractive index on an optical axis of the negative lens in the optical system for f-line light having a wavelength $\lambda f$, and
Nnc is a refractive index on an optical axis of the negative lens in the optical system for c-line light having a wavelength $\lambda c$.

In a case where the optical system is constituted only by refractive optical components, the third term of the right side of each of the expressions (10a) and (10e) is omitted.

Generally, it is desired that the value of the axial chromatic aberration coefficient is small. Thus, in a case where the optical system is constituted only by refractive optical components, the refractive power of the positive lens and that of the negative lens are uniquely determined by once selecting Abbe numbers of the materials of the positive lens and the negative lens.

Generally, in a case where the power of the positive lens and the power of the negative lens are inappropriate, spherical aberration and other Seidel aberrations are adversely affected. Thus, it is necessary to set an appropriate difference between the Abbe numbers of the materials of the positive lens and the negative lens.

However, in a case where the optical system includes a diffraction portion, as is understood from the expressions (10a) and (10c), the diffraction portion has a negative dispersion value whose absolute value is large.

Therefore, for example, in a case where the entire optical system has a positive refractive power, the glass materials of the refractive optical components are more flexibly selected by setting the diffraction portion to have a positive refractive power. Consequently, the optical system, whose chromatic aberration and Seidel aberration typified by chromatic aberration is optimally corrected, can be implemented without increasing the number of optical elements of the optical system.

However, as is seen from the expression (10d), the dispersion value of the material of the diffraction portion is −3.2, in comparison with the dispersion value of ordinary glass, which ranges from 15 to 100. That is, the dispersion value of the material of the diffraction portion differs from that of ordinary glass in sign by one order of magnitude of the absolute value. Thus, very large inverse correction capability acts, so that the correction is excessive in a case where the power is large.

Additionally, only the color correction of colors represented by f-line light and c-line light is formulated herein. However, the optical system in each exemplary embodiment uses wavelengths of the entire visible light region. Thus, it is necessary to take the correction of chromatic aberration for all wavelengths of the visible light region into consideration.

Accordingly, it is necessary to optimize a proportion of the power of the diffraction portion to the power of the entire optical system by taking into consideration the wavelength characteristic of the glass selected as the material of the positive lens and the negative lens of the refractive optical system and the balance between chromatic aberration and Seidel aberration in the entire optical system.

Particularly, in a zoom lens, the state of light rays incident on a lens unit is changed according to zooming. Thus, it is necessary to consider the balance among various aberrations in the entire zooming range of the entire optical system.

Accordingly, the significance of the assignment of aberration to each of the lens units constituting the zoom lens depends upon the lens units.

The conditions (1) and (2) are set to optimize the power of the third lens unit C including the diffraction portion and the power of the diffraction portion according to the zooming type of the zoom lens in each exemplary embodiment.

To further reduce the variation of spherical aberration caused by zooming, halo, and coma aberration and to expand the wavelength range in which axial chromatic aberration is corrected, it is useful to set the numerical ranges of the conditions (1) and (2) as follows:

$$0.41 < fc/\sqrt{(fW \cdot fT)} < 0.80 \quad (1a), \text{ and}$$

$$50 < fdoe/fc < 270 \quad (2a).$$

As described above, according to each exemplary embodiment, a compact zoom lens having a high zoom ratio and a large aperture ratio can be configured by locating a diffractive optical element in the third lens unit C, which moves towards the object side during zooming, at a place closer to the image side than the second lens unit V for varying magnification in a positive-lead type zoom lens.

More specifically, a large-aperture-ratio and high-zoom-ratio zoom lens, which has an F-number of 1.5 to 1.8 and a zoom ratio of 40 or more, can be obtained.

To obtain a higher zoom ratio and good optical performance in each exemplary embodiment, it is useful to set the zoom lens to satisfy one or more of the following conditions. Thus, advantages corresponding to each of the following conditions are obtained.

That is, it is useful to satisfy one or more of the following conditions (3) to (9):

$$0.60 < fc \cdot \beta RT/\sqrt{(fW \cdot fT)} < 0.90 \quad (3)$$

$$2 < fdoe/fT < 30 \quad (4)$$

$$0.016 < (1/vcp)ave < 0.030 \quad (5)$$

$$0.012 < (1/vcn)ave - (1/vcp)ave \quad (6)$$

$$(ncp)ave > 1.60 \quad (7)$$

$$1.4 < |(\beta cW - \beta cT)|/\sqrt{(\beta cT \cdot \beta cW)} < 2.5 \quad (8)$$

$$40 < fdoe/D < 250 \quad (9)$$

where βRT designates a lateral magnification of a lens unit located closer to the image side than the third lens unit at the telephoto end, (1/vcp)ave and (1/vcn)ave denote an average value of a reciprocal of the Abbe number of the material of positive lenses included in the third lens unit C and that of a reciprocal of the Abbe number of the material of negative lenses included in the third lens unit C, respectively, (ncp)ave represents an average value of a refractive index of the material of positive lenses included in the third lens unit C, βcW and βcT designate image-forming magnifications of the third lens unit C at a wideangle end and at a telephoto end, respectively, and D denotes a maximum diameter of the diffractive optical element.

Next, the technical meaning of each of the conditions (3) to (9) will be described.

In a case where the upper limit of the condition (3) is exceeded, the refractive power of the third lens unit C is too small. Alternatively, the magnification (or zoom ratio) assigned to the lens unit located closer to the image side than the third lens unit C is too large. Consequently, the configuration of the lens unit located closer to the image side than the third lens unit C is complex. In each case, the total length of the zoom lens is large.

In a case where the lower limit of the condition (3) is exceeded, the refractive power of the third lens unit C is too large. Alternatively, the magnification (or zoom ratio) assigned to the lens unit located closer to the image side than the third lens unit C is too small. Therefore, the aberration to be corrected by the second lens unit (zooming lens unit) V becomes large. Consequently, the variation of aberration, which is caused by the movement of the second lens unit V or the third lens unit C for zooming, is increased or deteriorated. Also, the size of the second lens unit V or the third lens unit C is increased.

The condition (4) is determined for appropriately setting a ratio of the focal length of the diffraction portion of the diffractive optical element to the focal length of the entire lens system at the telephoto end.

In a case where the zoom ratio of the zoom lens is high, the variation of axial chromatic aberration due to zooming is large. Particularly, in the case of a super-telephoto type zoom lens, large axial chromatic aberration occurs at the telephoto end.

In a case where the upper limit of the condition (4) is exceeded, and the refractive power of the diffraction portion is small, it is difficult to correct axial chromatic aberration at the telephoto end.

In a case where the lower limit of the condition (4) is exceeded, and the refractive power of the diffraction portion is too large, axial chromatic aberration is corrected too much. Also, it is difficult to select an appropriate glass material.

In a case where the lower limit of the condition (5) is exceeded, a mean dispersion of the material of positive lenses included in the third lens unit C is small, so that the power of the diffraction portion is low. Consequently, it is difficult to correct axial chromatic aberration at a place closer to the telephoto end than the F-drop point.

Generally, low-dispersion glass has a tendency towards a low refractive index. Thus, it is difficult to reduce the variation of spherical aberration, halo, and coma aberration due to zooming. In addition, the total length of the zoom lens increases.

In a case where the upper limit of the condition (5) is exceeded, the mean dispersion of the material of positive lenses included in the third lens unit C is high, so that the power of the diffraction portion is too large. Unfavorably, axial chromatic aberration is excessively corrected over the entire zooming range.

In a case where the ranges determined by the conditions (6) and (7) are exceeded, it is difficult to appropriately set individual elements constituting the third lens unit C. Consequently, it is difficult to reduce the variation of spherical aberration, halo, and coma aberration due to zooming. Thus, the number of constituent elements should be increased, and the total length of the zoom lens increases to an undesirable extent.

The condition (8) defines the range of a part of the lateral magnification, which is assigned to the third lens unit C, due to zooming. More particularly, the condition (8) appropriately defines a proportion of a change in the lateral magnification of the third lens unit C, which is caused by zooming from the wide-angle end to the telephoto end, to an average lateral magnification of the lens unit C.

In a case where the upper limit of the condition (8) is exceeded, the change in the lateral magnification of the third lens unit C, which is caused by zooming from the wide-angle end to the telephoto end, is larger than the average lateral magnification of the lens unit C, so that the aberration correction capability of the third lens unit C is higher than that of the other lens units over the entire zooming range.

Thus, the lens configuration of the third lens unit C is complicated. Unless the number of elements of the lens unit C is increased, which is not desirable, it is difficult to correct the variation of, for example, spherical aberration, halo, and coma aberration.

In a case where the lower limit of the condition (8) is exceeded, the change in the lateral magnification of the third lens unit C, which is caused by zooming from the wide-angle end to the telephoto end, is smaller than the average lateral magnification of the lens unit C, so that a proportion of the lateral magnification, which is assigned to the third lens unit C, is too small. Consequently, a proportion of the lateral magnification, which is assigned to the other lens units, is large.

Thus, the stroke lengths of the other magnification varying lens units are increased. The total length of the zoom lens is thus increased. Also, a burden of aberration correction to be placed on the other lens units is increased. Consequently, the number of constituent elements of the other lens units should be increased. Accordingly, the total length of the zoom lens is increased.

Additionally, a proportion of the aberration correction, which should be placed on the other lens units, is decreased. Consequently, it is difficult to correct axial chromatic aberration from the F-drop point to the telephoto end using the diffraction portion included in the third lens unit C.

The condition (9) relates to a pitch of a diffractive pattern of the diffraction portion.

In a case where the upper limit of the condition (9) is exceeded, the power of the diffraction portion is too low. Thus, the advantage in correcting chromatic aberration is decreased.

In a case where the lower limit of the condition (9) is exceeded, the pitch of the diffractive pattern is too small. It is then difficult to manufacture the zoom lens.

Thus, according to each exemplary embodiment, the diffractive optical element is appropriately used in a part of the zoom lens. Consequently, a zoom lens, which has a large aperture ratio, a high zoom ratio, and good optical performance over the entire zooming range and which is suitable for use with, for example, a television camera, a video camera, and a photographing camera, can be obtained.

According to each exemplary embodiment, the numerical ranges to be defined by the conditions (3) to (9) can be set as follows:

$$0.65 < fc \cdot \beta RT/\sqrt{(fW \cdot fT)} < 0.85 \quad (3a)$$

$$4 < fdoe/fT < 25 \quad (4a)$$

$$0.017 < (1/vcp)ave < 0.026 \quad (5a)$$

$$0.013 < (1/vcn)ave - (1/vcp)ave \quad (6a)$$

$$(ncp)ave > 1.64 \quad (7a)$$

$$1.5 < |(\beta cW - \beta cT)/\sqrt{(\beta cT \cdot \beta cW)}| < 2.3 \quad (8a)$$

$$50 < fdoe/D < 230 \quad (9a)$$

In each exemplary embodiment, the correction of aberration can be implemented as follows. The lens elements constituting the third lens unit C can include at least three or more positive lenses, one or more negative lenses, and one diffractive optical element.

Alternatively, the third lens unit C can include two or more positive lenses, at least one of the surfaces of which is an aspheric surface.

Consequently, the third lens unit C can have an appropriate number of optical elements. Also, because at least one of surfaces of the elements of the third lens unit C is an aspheric surface, a capability of the third lens unit to correct the variation of various aberrations occurring due to zooming can be enhanced. Additionally, a high-zoom-ratio zoom lens, the size of the entire system of which is compact, can be achieved by increasing a proportion of the magnification, which is assigned to the third lens unit C.

The diffraction portion itself can have an advantage of an aspherical surface. This is achieved by giving values to a coefficient C4 of a bi-quadratic term and coefficients of higher-order terms of a function of the distance h from the optical axis in the expression (a) representing the phase of the diffraction portion in each exemplary embodiment.

Consequently, in addition to the above-described effects of the aspheric surface on aberrations other than chromatic aberration, since advantages of the aspheric surface due to the diffraction gratings vary with wavelengths, the correction of variation of the color difference due to spherical aberration can be facilitated at a place closer to the telephoto end side than the F-drop point.

An aperture stop SP can be located at the image side of the third lens unit C.

Thus, the aperture stop SP is located at a place closer to the image side than a lens unit that greatly contributes to varying magnification. Consequently, an exit pupil can be always held at a fixed far-off position independent of zooming.

Accordingly, in a case where the zoom lens is used in a color camera including a color separation system typified by triple prisms and a charge coupled device (CCD) or a complementary metal-oxide semiconductor (CMOS) device, the characteristic of which is changed according to an incidence angle, as an image sensor in an image pickup portion, degradation in image quality due to color shading is minimized.

Hereinafter, the configuration of a diffractive optical element used in the zoom lens in each exemplary embodiment is described. FIG. 36 is an enlarged cross-sectional view of a diffraction portion of a diffractive optical element 1. As illustrated in FIG. 36, a diffraction grating 3 constituted by a single layer is provided on a substrate (transparent substrate) 2. FIG. 37 illustrates a characteristic of diffraction efficiency of the diffractive optical element 1. In FIG. 37, the abscissa axis represents wavelength. The ordinate represents a diffraction efficiency that is a proportion of an amount of diffracted light to a total amount of transmitted light flux. However, for brevity of description, reflection light on a boundary surface of the diffraction grating is not taken into consideration.

An ultraviolet curable resin, which has a refractive index nd=1.513 and an Abbe number vd=51.0, is used as an optical material of the diffraction grating 3. The grating thickness d1 is set at 1.03 μm. The diffraction efficiency of +first-order diffracted light having a wavelength of 530 nm is set to be highest. Thus, a designed order of the diffracted light corresponding to the highest diffraction efficiency is +first-order. A designed wavelength of the diffracted light corresponding to the highest diffraction efficiency is 530 nm. In FIG. 37, the diffraction efficiency of +first-order diffracted light is represented by a solid curve.

FIG. 37 illustrates also diffraction efficiencies of diffracted light rays respectively corresponding to diffraction orders ((+first-order±1)-th order (i.e., 0-th order and +second-order)) in the vicinity of the designed order. As is seen from FIG. 36, the diffraction efficiency at the designed order has a highest value that is obtained at a wavelength in the vicinity of the designed wavelength. The diffraction efficiency is gradually decreased at wavelengths other than the wavelength in the vicinity of the designed wavelength.

An amount of light energy corresponding to a decrease in diffraction efficiency, which is caused at the designed order and at each of wavelengths other than the designed wavelength, is distributed to other diffraction-order diffracted light rays. This causes a "flare" phenomenon. In a case where diffractive optical elements are used at a plurality of places in the optical system, the decrease in diffraction efficiency at wavelengths other than the designed wavelength results in a decrease in transmissivity of light.

Next, a laminated type diffractive optical element obtained by stacking a plurality of diffraction gratins respectively made of different materials is described below. FIG. 38 is an enlarged cross-sectional view of a part of such a laminated type diffractive optical element. FIG. 39 is a graph illustrating a wavelength dependency of the diffraction efficiency of +first-order diffracted light of the diffractive optical element illustrated in FIG. 38. In the diffractive optical element illustrated in FIG. 38, a first diffraction grating 104 made of an ultraviolet curable resin, which has a refractive index nd=1.499 and an Abbe number vd=54.0, is provided on a substrate 102. Additionally, a second diffraction grating 105 made of another ultraviolet curable resin, which has a refractive index nd=1.598 and an Abbe number vd=28.0, is provided on the first diffraction grating 104. In the case of the combination of such materials, a thickness d1 of the first diffraction grating 104 is set at 13.8 μm. A thickness d2 of the second diffraction grating 105 is set at 10.5 μm.

As is understood from FIG. 39, high diffraction efficiencies of 95% or more are obtained over the entire range of wavelengths of used diffraction light rays of the designed order (visible range) by employing the diffractive optical element having the diffraction gratings of laminated structures.

The material of the diffraction gratings of the diffractive optical element of the laminated structure is not limited to an ultraviolet curable resin. Other plastic materials can be used as the material of the diffraction gratings. In the case of some base material, the first layer can be formed directly on the base material. The gratings are not necessarily different in thickness from one another. As illustrated in FIG. 40, in some combination of the materials, the thicknesses of the two layers 104 and 105 can be set to be equal to each other. In this case, no diffraction grating shapes are formed on the surface of the substrate. Thus, the dust-resistance of the diffractive optical element can be enhanced. The assemblability of the diffractive optical element can be enhanced. Additionally, it is not necessary to bring the two diffraction gratings 104 and 105 into close contact with each other. The two diffraction gratings 104 and 105 can be disposed to face each other across an air gap.

Hereinafter, numerical examples 1 to 5 respectively corresponding to the first to fifth exemplary embodiments are described. In the following description of the numerical examples 1 to 5, "i" designates the ordinal number of each optical surface from the object side. Further, "Ri" denotes a radius of curvature of the i-th optical surface, "Di" designates an interval between the i-th surface and the (i+1)-th surface, and "Ni" and "vi" respectively denote a refractive index and an Abbe number of the material of the i-th optical member. Additionally, "f", "Fno", and "2ω" represent a focal length, an F-number, and an angle of view, respectively.

The last two optical surfaces are those of a glass block, such as a filter.

An aspherical shape is expressed by the following equation:

$$X=(1/R)H^2/[1+[1-(1+k)(H/R)^2]^{1/2}]+AH^4+BH^6+CH^8+DH^{10}+EHh^{12}$$

where "X" designates an X-axis extending along the optical axis, "H" denotes an H-axis extending in a direction perpendicular to the optical axis, a "positive direction" is set to be a traveling direction in which light travels, "R" designates a paraxial radius of curvature, "k" designates a conic constant, and each of "A", "B", "C", "D", and "E" is an aspheric coefficient corresponding to an associated order.

A diffractive optical surface (diffractive surface) is represented by giving phase coefficients of the above-described phase function φ(h):

$$\phi(h)=(2\pi/\lambda d)\cdot(C2\cdot h^2+C4\cdot h^4+\ldots C2\cdot i\cdot h^2)$$

Moreover, the expression "e-z" means "×10$^{-z}$".

Furthermore, Table 1 shows the relationship between the conditional expressions and numerical values in the following numerical examples.

NUMERICAL EXAMPLE 1 f = 10-364.50-810.0 Fno = 1:1.8-1.8-4.4 2ω = 57.6°-1.73°-0.78°

| | | | |
|---|---|---|---|
| R1 = 636.561 | D1 = 17.71 | N1 = 1.496999 | v1 = 81.5 |
| R2 = −785.554 | D2 = 1.09 | | |
| R3 = −689.863 | D3 = 5.44 | N2 = 1.799516 | v2 = 42.2 |
| R4 = 388.625 | D4 = 1.46 | | |
| R5 = 445.258 | D5 = 19.96 | N3 = 1.433870 | v3 = 95.1 |
| R6 = −696.109 | D6 = 22.84 | | |
| R7 = 304.196 | D7 = 22.87 | N4 = 1.433870 | v4 = 95.1 |
| R8 = −1622.992 | D8 = 0.27 | | |
| R9 = 298.792 | D9 = 15.78 | N5 = 1.433870 | v5 = 95.1 |
| R10 = 2178.982 | D10 = 2.63 | | |
| R11 = 202.971 | D11 = 12.27 | N6 = 1.496999 | v6 = 81.5 |
| R12 = 373.292 | D12 = Variable | | |
| R13 = 252.238 | D13 = 2.00 | N7 = 1.816000 | v7 = 46.6 |
| R14 = 63.372 | D14 = 7.36 | | |
| R15 = −269.104 | D15 = 1.90 | N8 = 1.754998 | v8 = 52.3 |
| R16 = 105.411 | D16 = 5.94 | | |
| R17 = −114.214 | D17 = 1.90 | N9 = 1.754998 | v9 = 52.3 |
| R18 = 58.208 | D18 = 10.32 | N10 = 1.922864 | v10 = 21.3 |
| R19 = −131.561 | D19 = 6.15 | | |
| R20 = −89.028 | D20 = 2.21 | N11 = 1.882997 | v11 = 40.8 |
| R21 = 195.263 | D21 = Variable | | |
| R22 = 598.599 | D22 = 12.32 | N12 = 1.754998 | v12 = 52.3 |
| *R23 = −129.129 | D23 = 0.20 | | |
| R24 = 115.935 | D24 = 13.86 | N13 = 1.754998 | v13 = 52.3 |
| R25 = −419.502 | D25 = 0.20 | | |
| R26 = −3075.713 | D26 = 2.50 | N14 = 1.805181 | v14 = 25.4 |
| *R27 = 65.293 (Diffractive Optical Surface) | D27 = 13.65 | N15 = 1.518229 | v15 = 58.9 |
| R28 = 319.451 | D28 = 0.20 | | |
| R29 = 117.500 | D29 = 7.61 | N16 = 1.754998 | v16 = 52.3 |
| R30 = ∞ | D30 = Variable | | |
| R31 = Stop | D31 = 4.50 | | |
| R32 = −127.457 | D32 = 1.80 | N17 = 1.816000 | v17 = 46.6 |
| R33 = 47.118 | D33 = 0.20 | | |
| R34 = 35.662 | D34 = 5.26 | N18 = 1.808095 | v18 = 22.8 |
| R35 = 132.723 | D35 = 5.59 | | |
| R36 = −51.547 | D36 = 2.00 | N19 = 1.882997 | v19 = 40.8 |
| R37 = 304.498 | D37 = 30.37 | N20 = 1.805181 | v20 = 25.4 |
| R38 = −292.754 | D38 = 5.72 | | |
| R39 = 194.200 | D39 = 8.10 | N21 = 1.620411 | v21 = 60.3 |
| R40 = −108.683 | D40 = 0.20 | | |
| R41 = −3217.509 | D41 = 2.10 | N22 = 1.834000 | v22 = 37.2 |
| R42 = 46.615 | D42 = 9.18 | N23 = 1.570989 | v23 = 50.8 |

-continued f = 10-364.50-810.0 Fno = 1:1.8-1.8-4.4 2ω = 57.6°-1.73°-0.78°

| | | | |
|---|---|---|---|
| R43 = −46.524 | D43 = 0.20 | | |
| R44 = 224.229 | D44 = 8.84 | N24 = 1.487490 | ν24 = 70.2 |
| R45 = −34.862 | D45 = 2.10 | N25 = 1.834000 | ν25 = 37.2 |
| R46 = −149.334 | D46 = 0.20 | | |
| R47 = 102.481 | D47 = 6.35 | N26 = 1.620411 | ν26 = 60.3 |
| R48 = −1068.223 | D48 = 2.00 | | |
| R49 = ∞ | D49 = 55.50 | N27 = 1.516330 | ν27 = 64.2 |
| R50 = ∞ | D50 = 10.00 | | |

Focal Length

| Variable Interval | 10.00 | 364.50 | 810.00 |
|---|---|---|---|
| D12 | 1.54 | 171.30 | 180.07 |
| D21 | 270.64 | 42.44 | 5.64 |
| D30 | 2.00 | 60.43 | 88.46 |

Aspheric Coefficients

| R23 | k = −6.40628e−01 | A = 4.13359e−08 | B = −1.329064e−11 |
|---|---|---|---|
| | C = 2.44920e−14 | D = −1.352975e−17 | E = 2.700298e−21 |

Phase Coefficients

| R27 | C2 = −4.94527e−05 | C4 = −3.27643e−09 |
|---|---|---|

NUMERICAL EXAMPLE 2 f = 15-554.7-1500.0 Fno = 1:2.7-2.7-7.3 2ω = 40.3°-1.14°-0.42°

| | | | |
|---|---|---|---|
| R1 = 732.442 | D1 = 16.88 | N1 = 1.455999 | ν1 = 90.3 |
| R2 = −848.118 | D2 = 1.00 | | |
| R3 = −871.969 | D3 = 5.40 | N2 = 1.799516 | ν2 = 42.2 |
| R4 = 392.340 | D4 = 1.45 | | |
| R5 = 431.585 | D5 = 23.00 | N3 = 1.433870 | ν3 = 95.1 |
| R6 = −666.922 | D6 = 26.12 | | |
| R7 = 322.326 | D7 = 24.22 | N4 = 1.433870 | ν4 = 95.1 |
| R8 = −1119.399 | D8 = 0.20 | | |
| R9 = 263.932 | D9 = 15.96 | N5 = 1.433870 | ν5 = 95.1 |
| R10 = 1028.858 | D10 = 5.42 | | |
| R11 = 180.743 | D11 = 12.63 | N6 = 1.438750 | ν6 = 95.0 |
| R12 = 320.860 | D12 = Variable | | |
| R13 = 331.323 | D13 = 1.90 | N7 = 1.816000 | ν7 = 46.6 |
| R14 = 48.321 | D14 = 6.54 | | |
| R15 = −171.948 | D15 = 1.80 | N8 = 1.754998 | ν8 = 52.3 |
| R16 = 292.976 | D16 = 4.25 | | |
| R17 = −73.837 | D17 = 1.80 | N9 = 1.754998 | ν9 = 52.3 |
| R18 = 61.998 | D18 = 9.03 | N10 = 1.922864 | ν10 = 21.3 |
| R19 = −85.033 | D19 = 5.00 | | |
| R20 = −68.686 | D20 = 2.00 | N11 = 1.882997 | ν11 = 40.8 |
| R21 = 255.319 | D21 = Variable | | |
| R22 = −1563.791 | D22 = 10.45 | N12 = 1.729157 | ν12 = 54.7 |
| *R23 = −98.929 | D23 = 0.20 | | |
| R24 = 113.29709 | D24 = 13.00 | N13 = 1.729157 | ν13 = 54.7 |
| R25 = −340.998 | D25 = 0.20 | | |
| R26 = 422.049 | D26 = 2.50 | N14 = 1.834000 | ν14 = 37.2 |
| R27 = 277.876 | D27 = 4.67 | | |
| R28 = −549.895 | D28 = 2.50 | N15 = 1.805181 | ν15 = 25.4 |
| *R29 = 75.693 (Diffractive Optical Surface) | D29 = 10.00 | N16 = 1.518229 | ν16 = 58.9 |
| R30 = 463.705 | D30 = 1.19 | | |
| *R31 = 119.003 | D31 = 10.55 | N17 = 1.729157 | ν17 = 54.7 |
| R32 = −320.812 | D32 = Variable | | |
| R33 = Stop | D33 = 4.50 | | |
| R34 = −254.227 | D34 = 1.80 | N18 = 1.816000 | ν18 = 46.6 |
| R35 = 53.410 | D35 = 0.20 | | |
| R36 = 34.907 | D36 = 5.05 | N19 = 1.846660 | ν19 = 23.8 |
| R37 = 79.500 | D37 = 4.28 | | |
| R38 = −64.975 | D38 = 4.00 | N20 = 1.834807 | ν20 = 42.7 |
| R39 = 650.598 | D39 = 31.11 | N21 = 1.784723 | ν21 = 25.7 |
| R40 = −295.709 | D40 = 9.79 | | |

-continued f = 15-554.7-1500.0 Fno = 1:2.7-2.7-7.3 2ω = 40.3°-1.14°-0.42°

| | | | |
|---|---|---|---|
| R41 = 191.683 | D41 = 2.10 | N22 = 1.800999 | ν22 = 35.0 |
| R42 = 35.367 | D42 = 6.86 | N23 = 1.548141 | ν23 = 45.8 |
| R43 = 348.360 | D43 = 2.00 | | |
| R44 = 900.885 | D44 = 2.10 | N24 = 1.834000 | ν24 = 37.2 |
| R45 = 487.452 | D45 = 7.61 | N25 = 1.516330 | ν25 = 64.1 |
| R46 = −39.554 | D46 = 1.00 | | |
| R47 = 118.711 | D47 = 2.10 | N26 = 1.834000 | ν26 = 37.2 |
| R48 = 19.267 | D48 = 9.73 | N27 = 1.581439 | ν27 = 40.8 |
| R49 = −134.021 | D49 = 2.00 | | |
| R50 = ∞ | D50 = 55.50 | N28 = 1.516330 | ν28 = 64.2 |
| R51 = ∞ | D51 = 10.03 | | |

Focal Length

| Variable Interval | 15.00 | 554.74 | 1500.90 |
|---|---|---|---|
| D12 | 1.21 | 172.13 | 182.37 |
| D21 | 270.80 | 46.55 | 3.71 |
| D30 | 2.00 | 55.33 | 87.94 |

Aspheric Coefficients

| R23 | k = −5.51466e−01 | A = 1.17385e−07 | B = −8.83532e−11 |
|---|---|---|---|
| | C = 9.55676e−14 | D = −5.02750e−17 | E = 9.89178e−21 |
| R31 | k = 1.44496e−00 | A = −5.12701e−08 | B = −4.65349e−11 |
| | C = −1.41868e−14 | D = 1.17090e−17 | E = −3.63982e−21 |

Phase Coefficients

| R29 | C2 = −8.88573e−05 | C4 = 4.18896e−09 |
|---|---|---|

NUMERICAL EXAMPLE 3 f = 14-554.5-1643.1 Fno = 1:2.7-2.7-8.0 2ω = 42.9°-1.14°-0.38°

| | | | |
|---|---|---|---|
| R1 = 1502.957 | D1 = 13.07 | N1 = 0.438750 | ν1 = 95.0 |
| R2 = −741.381 | D2 = 0.20 | | |
| R3 = −1105.368 | D3 = 5.20 | N2 = 1.785896 | ν2 = 44.2 |
| R4 = 358.543 | D4 = 3.42 | | |
| R5 = 360.328 | D5 = 27.76 | N3 = 1.438750 | ν3 = 95.0 |
| R6 = −607.262 | D6 = 42.93 | | |
| R7 = 355.995 | D7 = 22.00 | N4 = 1.433870 | ν4 = 95.1 |
| R8 = −1855.435 | D8 = 0.20 | | |
| R9 = 264.441 | D9 = 18.59 | N5 = 1.433870 | ν5 = 95.1 |
| R10 = 1257.725 | D10 = 1.30 | | |
| R11 = 195.503 | D11 = 11.26 | N6 = 1.438750 | ν6 = 95.0 |
| R12 = 319.684 | D12 = Variable | | |
| R13 = 170.508 | D13 = 3.00 | N7 = 1.882997 | ν7 = 40.8 |
| R14 = 78.639 | D14 = 3.38 | | |
| R15 = 267.414 | D15 = 2.00 | N8 = 1.882997 | ν8 = 40.8 |
| R16 = 52.235 | D16 = 6.95 | | |
| R17 = −71.744 | D17 = 2.00 | N9 = 1.754998 | ν9 = 52.3 |
| R18 = 49.691 | D18 = 7.96 | N10 = 1.922864 | ν10 = 21.3 |
| R19 = −111.852 | D19 = 3.00 | | |
| R20 = −77.509 | D20 = 2.00 | N11 = 1.882997 | ν11 = 40.8 |
| R21 = 208.570 | D21 = Variable | | |
| R22 = 98.603 | D22 = 15.56 | N12 = 1.754998 | ν12 = 52.3 |
| *R23 = −328.401 | D23 = 0.20 | | |
| *R24 = 109.902 | D24 = 9.65 | N13 = 1.754998 | ν13 = 52.3 |
| R25 = 2642.330 | D25 = 3.00 | N14 = 1.922864 | ν14 = 21.3 |
| *R26 = 82.746 (Diffractive Optical Surface) | D26 = 11.59 | | |
| *R27 = 70.068 | D27 = 12.15 | N15 = 1.772499 | ν15 = 49.6 |
| R28 = ∞ | D28 = Variable | | |
| R29 = Stop | D29 = 2.50 | | |
| R30 = −176.042 | D30 = 1.40 | N16 = 1.816000 | ν16 = 46.6 |
| R31 = 44.060 | D31 = 0.20 | | |
| R32 = 40.178 | D32 = 5.56 | N17 = 1.808095 | ν17 = 22.8 |
| R33 = 130.012 | D33 = 14.09 | | |
| R34 = −152.199 | D34 = 1.80 | N18 = 1.772499 | ν18 = 49.6 |

-continued

| f = 14-554.5-1643.1 Fno = 1:2.7-2.7-8.0 2ω = 42.9°-1.14°-0.38° | | | |
|---|---|---|---|
| R35 = 152.6558 | D35 = 30.00 | N19 = 1.805150 | ν19 = 25.5 |
| R36 = −166.079 | D36 = 7.50 | | |
| R37 = 507.804 | D37 = 1.60 | N20 = 1.800999 | ν20 = 35.0 |
| R38 = 36.107 | D38 = 5.00 | N21 = 1.548141 | ν21 = 45.8 |
| R39 = −60.145 | D39 = 0.96 | | |
| R40 = −44.582 | D40 = 1.60 | N22 = 1.800999 | ν22 = 35.0 |
| R41 = 31.681 | D41 = 7.12 | N23 = 1.548141 | ν23 = 45.8 |
| R42 = −35.652 | D42 = 0.20 | | |
| R43 = −174.367 | D43 = 7.26 | N24 = 1.516330 | ν24 = 64.1 |
| R44 = −30.934 | D44 = 1.60 | N25 = 1.761821 | ν25 = 26.5 |
| R45 = −39.287 | D45 = 2.00 | | |
| R46 = ∞ | D46 = 55.0 | N26 = 1.516330 | ν26 = 64.1 |
| R47 = ∞ | D47 = 10.03 | | |

| | Focal Length | | |
|---|---|---|---|
| Variable Interval | 14.00 | 554.53 | 1643.06 |
| D12 | 2.99 | 193.08 | 204.87 |
| D21 | 291.73 | 48.95 | 1.34 |
| D30 | 2.36 | 55.04 | 90.87 |

| Aspheric Coefficients | | | |
|---|---|---|---|
| R23 | k = 1.99854e−01 | A = −2.786933e−07 | B = 1.258369e−10 |
| | C = 4.086102e−14 | D = −3.151543e−17 | E = 5.188322e−21 |
| R24 | k = −4.274656e−02 | A = 9.714818e−09 | B = −1.189069e−11 |
| | C = 8.082837e−15 | D = 1.245779e−17 | E = −7.281496e−21 |
| R27 | k = −2.487025e−00 | A = −8.665634e−08 | B = −1.193962e−11 |
| | C = 2.378192e−14 | D = −4.438134e−17 | E = 1.111859e−20 |

| Phase Coefficients | | |
|---|---|---|
| R26 | C2 = −1.008065e−04 | C4 = −9.722618e−09 |
| | C6 = 2.261079e−11 | C8 = −1.055741e−14 |

NUMERICAL EXAMPLE 4

| f = 8.0-380.8-846.2 Fno = 1:1.8-1.8-4 2ω = 69.0°-3.3°-0.74° | | | |
|---|---|---|---|
| R1 = 693.192 | D1 = 29.01 | N1 = 1.455999 | ν1 = 90.3 |
| R2 = −872.683 | D2 = 4.00 | | |
| R3 = −741.718 | D3 = 6.00 | N2 = 1.799516 | ν2 = 42.2 |
| R4 = 418.026 | D4 = 4.00 | | |
| R5 = 505.043 | D5 = 29.59 | N3 = 1.433870 | ν3 = 95.1 |
| R6 = −709.888 | D6 = 20.95 | | |
| R7 = 328.606 | D7 = 28.19 | N4 = 1.433870 | ν4 = 95.1 |
| R8 = −1528.012 | D8 = 0.30 | | |
| R9 = 319.313 | D9 = 17.05 | N5 = 1.433870 | ν5 = 95.1 |
| R10 = 2429.941 | D10 = 2.80 | | |
| R11 = 212.833 | D11 = 12.95 | N6 = 1.496999 | ν6 = 81.5 |
| R12 = 403.685 | D12 = Variable | | |
| R13 = 386.869 | D13 = 2.00 | N7 = 1.816000 | ν7 = 46.6 |
| R14 = 55.858 | D14 = 7.31 | | |
| R15 = 443.443 | D15 = 1.90 | N8 = 1.754998 | ν8 = 52.3 |
| R16 = 91.399 | D16 = 6.08 | | |
| R17 = −208.967 | D17 = 1.90 | N9 = 1.754998 | ν9 = 52.3 |
| R18 = 45.369 | D18 = 10.76 | N10 = 1.922864 | ν10 = 21.3 |
| R19 = −246.238 | D19 = 5.96 | | |
| R20 = −84.151 | D20 = 2.21 | N11 = 1.882997 | ν11 = 40.8 |
| R21 = 173.862 | D21 = Variable | | |
| R22 = 327.936 | D22 = 9.99 | N12 = 1.754998 | ν12 = 52.3 |
| *R23 = −123.558 | D23 = 0.20 | | |
| *R24 = 110.777 (Diffractive Optical Surface) | D24 = 9.81 | N13 = 1.638539 | ν13 = 55.4 |
| R25 = −372.956 | D25 = 0.20 | | |
| R26 = −647.051 | D26 = 2.40 | N14 = 1.805181 | ν14 = 25.4 |
| R27 = 68.834 | D27 = 12.61 | N15 = 1.487490 | ν15 = 70.2 |
| R28 = 544.713 | D28 = 0.20 | | |

-continued

| f = 8.0-380.8-846.2 Fno = 1:1.8-1.8-4 2ω = 69.0°-3.3°-0.74° | | | |
|---|---|---|---|
| R29 = 105.526 | D29 = 11.55 | N16 = 1.754998 | ν16 = 52.3 |
| R30 = ∞ | D30 = Variable | | |
| R31 = Stop | D31 = 4.50 | | |
| R32 = −134.837 | D32 = 1.80 | N17 = 1.816000 | ν17 = 46.6 |
| R33 = 42.318 | D33 = 0.20 | | |
| R34 = 33.556 | D34 = 4.05 | N18 = 1.808095 | ν18 = 22.8 |
| R35 = 113.071 | D35 = 4.61 | | |
| R36 = −47.922 | D36 = 2.00 | N19 = 1.882997 | ν19 = 40.8 |
| R37 = 70.233 | D37 = 34.01 | N20 = 1.805181 | ν20 = 25.4 |
| R38 = −271.103 | D38 = 12.81 | | |
| R39 = 153.098 | D39 = 8.00 | N21 = 1.620411 | ν21 = 60.3 |
| R40 = −73.150 | D40 = 0.20 | | |
| R41 = −192.611 | D41 = 2.10 | N22 = 1.834000 | ν22 = 37.2 |
| R42 = 50.793 | D42 = 7.56 | N23 = 1.570989 | ν23 = 50.8 |
| R43 = −47.306 | D43 = 0.50 | | |
| R44 = 551.944 | D44 = 6.94 | N24 = 1.487490 | ν24 = 70.2 |
| R45 = −34.379 | D45 = 2.10 | N25 = 1.834000 | ν25 = 37.2 |
| R46 = −154.409 | D46 = 0.40 | | |
| R47 = 60.113 | D47 = 4.21 | N26 = 1.620411 | ν26 = 60.3 |
| R48 = −1068.223 | D48 = 2.00 | | |
| R49 = ∞ | D49 = 55.50 | N27 = 1.516330 | ν27 = 64.2 |
| R50 = ∞ | D50 = 9.59 | | |

| | Focal Length | | |
|---|---|---|---|
| Variable Interval | 8.00 | 380.80 | 846.22 |
| D12 | 2.00 | 192.40 | 200.74 |
| D21 | 288.39 | 38.59 | 2.50 |
| D30 | 2.50 | 61.89 | 89.65 |

| Aspheric Coefficients | | | |
|---|---|---|---|
| R23 | k = −6.40628e−01 | A = 4.62912e−08 | B = −1.606629e−11 |
| | C = 3.093256e−14 | D = −1.900218e−17 | E = 4.089840e−21 |

| Phase Coefficients | | |
|---|---|---|
| R24 | C2 = −3.20000e−05 | C4 = −2.611598e−09 |

NUMERICAL EXAMPLE 5

| f = 10-257.23-440.00 Fno = 1:1.75-1.75-3.0 2ω = 57.6°-2.4°-1.43° | | | |
|---|---|---|---|
| R1 = 367.172 | D1 = 5.50 | N1 = 1.717362 | ν1 = 29.5 |
| R2 = 177.622 | D2 = 0.20 | | |
| R3 = 177.027 | D3 = 20.66 | N2 = 1.433870 | ν2 = 95.1 |
| R4 = −789.822 | D4 = 0.30 | | |
| R5 = 175.986 | D5 = 19.46 | N3 = 1.433870 | ν3 = 95.1 |
| R6 = −17084.408 | D6 = 0.30 | | |
| R7 = 140.587 | D7 = 13.26 | N4 = 1.496999 | ν4 = 81.5 |
| R8 = 320.763 | D8 = Variable | | |
| R9 = −400.153 | D9 = 2.00 | N5 = 1.882997 | ν5 = 40.8 |
| R10 = 49.572 | D10 = 7.50 | | |
| R11 = −175.956 | D11 = 1.80 | N6 = 1.754998 | ν6 = 52.3 |
| R12 = 66.685 | D12 = 5.47 | | |
| R13 = −69.295 | D13 = 1.80 | N7 = 1.772499 | ν7 = 49.6 |
| R14 = 47.661 | D14 = 7.70 | N8 = 1.922864 | ν8 = 21.3 |
| R15 = −224.348 | D15 = Variable | | |
| R16 = 774.231 | D16 = 6.12 | N9 = 1.701536 | ν9 = 41.2 |
| *R17 = −106.451 | D17 = 0.30 | | |
| R18 = 96.006 | D18 = 2.50 | N10 = 1.784723 | ν10 = 25.7 |
| R19 = 50.918 | D19 = 13.86 | N11 = 1.670029 | ν11 = 47.2 |
| R20 = −262.819 | D20 = 0.20 | | |
| *R21 = 313.147 (Diffractive Optical Surface) | D21 = 14.98 | N12 = 1.603420 | ν12 = 38.0 |
| R22 = −54.602 | D22 = 2.50 | N13 = 1.846660 | ν13 = 23.8 |
| R23 = 523.068 | D23 = 0.20 | | |
| R24 = 206.353 | D24 = 9.62 | N14 = 1.701536 | ν14 = 41.2 |
| R25 = −114.998 | D25 = Variable | | |
| R26 = Stop | D26 = 1.44 | | |

-continued f = 10-257.23-440.00 Fno = 1:1.75-1.75-3.0 2ω = 57.6°-2.4°-1.43°

| | | | |
|---|---|---|---|
| R27 = −43.145 | D27 = 1.80 | N15 = 1.785896 | ν15 = 44.2 |
| R28 = 20.613 | D28 = 4.37 | N16 = 1.805181 | ν16 = 25.4 |
| R29 = 57.648 | D29 = 6.58 | | |
| R30 = −27.058 | D30 = 1.60 | N17 = 1.729157 | ν17 = 54.7 |
| R31 = 31.702 | D31 = 12.34 | N18 = 1.603420 | ν18 = 38.0 |
| R32 = −27.060 | D32 = 25.36 | | |
| R33 = −480.705 | D33 = 7.60 | N19 = 1.516330 | ν19 = 38.0 |
| R34 = −36.580 | D34 = 0.20 | | |
| R35 = −350.545 | D35 = 1.98 | N20 = 1.804000 | ν20 = 46.6 |
| R36 = 35.497 | D36 = 9.00 | N22 = 1.516330 | ν21 = 64.1 |
| R37 = −52.453 | D37 = 1.10 | | |
| R38 = −139.614 | D38 = 7.29 | N22 = 1.548141 | ν22 = 45.8 |
| R39 = −32.513 | D39 = 2.20 | N23 = 1.805181 | ν23 = 25.4 |
| R40 = −108.641 | D40 = 0.20 | | |
| R41 = 41.444 | D41 = 6.48 | N24 = 1.517417 | ν24 = 52.4 |
| R42 = −402.002 | D42 = 5.00 | | |
| R43 = ∞ | D43 = 50 | N25 = 1.516330 | ν25 = 64.1 |
| R44 = ∞ | D44 = 13.37 | | |

| | Focal Length | | |
|---|---|---|---|
| Variable Interval | 10.00 | 257.23 | 440.00 |
| D8 | 3.42 | 116.95 | 122.43 |
| D15 | 177.13 | 20.68 | 1.17 |
| D25 | 7.00 | 49.92 | 63.96 |

Aspheric Coefficients

| | | | |
|---|---|---|---|
| R17 | k = 0.00 | A = 5.05886e−08 | B = 4.200354e−12 |
| | C = 1.786641e−14 | D = −4.343274e−17 | E = 0.0 |

Phase Coefficients

| R21 | C2 = −1.628406e−04 | C4 = 3.424814e−08 |
|---|---|---|

TABLE 1

| Conditional Expression | Numerical Example 1 | Numerical Example 2 | Numerical Example 3 | Numerical Example 4 | Numerical Example 5 |
|---|---|---|---|---|---|
| (1) | 0.750 | 0.433 | 0.429 | 0.790 | 0.784 |
| (2) | 149.788 | 86.569 | 76.308 | 240.385 | 59.048 |
| (3) | 0.781 | 0.785 | 0.775 | 0.762 | 0.822 |
| (4) | 12.482 | 3.751 | 3.019 | 18.464 | 6.978 |
| (5) | 0.019 | 0.018 | 0.019 | 0.018 | 0.024 |
| (6) | 0.021 | 0.015 | 0.028 | 0.022 | 0.017 |
| (7) | 1.696 | 1.676 | 1.761 | 1.658 | 1.699 |
| (8) | 2.021 | 2.111 | 2.241 | 2.202 | 1.730 |
| (9) | 137.849 | 73.215 | 65.627 | 218.838 | 52.219 |

Next, features of the configuration of the third lens unit C of each exemplary embodiment are described below.

The third lens unit C of the first exemplary embodiment illustrated in FIG. 1 includes four lens sub-units which have five lenses, that is, includes a positive lens (G1), a positive lens (G2), a cemented lens unit composed of a negative lens (G3) and a positive lens (G4), and a positive lens (G5) in order from the object side to the image side. The diffraction portion is formed on a cemented surface (27-th surface).

The image-side surface of the positive lens G1 is an aspherical surface.

The third lens unit C of the second exemplary embodiment illustrated in FIG. 8 includes five lens sub-units which have eight lenses, that is, includes a positive lens (G1), a positive lens (G2), a negative lens (G3), a cemented lens unit composed of a negative lens (G4) and a positive lens (G5), and a positive lens (G6) in order from the object side to the image side. The diffraction portion is formed on a cemented surface between the negative lens G4 and the positive lens G5 (29-th surface).

Additionally, the image-side surface of the positive lens G1 and the object-side surface of the positive lens G6 are aspherical surfaces.

The third lens unit C of the third exemplary embodiment illustrated in FIG. 15 includes three lens sub-units which have four lenses, that is, includes a positive lens (G1), a cemented lens unit composed of a positive lens (G2) and a negative lens (G3), and a positive lens (G4) in order from the object side to the image side. The diffraction portion is formed on an image-side surface of the negative lens G3 (26-th surface).

Further, the image-side surface of the positive lens G1, the image-side surface of the positive lens G2, and the object-side surface of the positive lens G4 are aspherical surfaces.

The third lens unit C of the fourth exemplary embodiment illustrated in FIG. 22 includes four lens sub-units which have five lenses, that is, includes a positive lens (G1), a positive lens (G2), a cemented lens unit composed of a negative lens (G3) and a positive lens (G4), and a positive lens (G5) in order from the object side to the image side. The diffraction portion is formed on the object-side surface of the positive lens G2 (24-th surface).

The image-side surface of the positive lens G2 is an aspherical surface.

The third lens unit C of the fifth exemplary embodiment illustrated in FIG. 29 includes four lens sub-units which have six lenses, that is, includes a positive lens (G1), a cemented lens unit composed of a negative lens (G2) and a positive lens (G3), a cemented lens unit composed of a positive lens (G4) and a negative lens (G5), and a positive lens (G6) in order from the object side to the image side. The diffraction portion is formed on the object-side surface of the positive lens G4 (21-th surface).

The image-side surface of the positive lens G1 is an aspherical surface.

In each exemplary embodiment, chromatic aberration is corrected well from the wide-angle end to the telephoto end, although relatively high-dispersion glass is used as the material of positive lenses of the third lens unit C.

This is due to achromatic effects caused by the inverse dispersion of the diffraction portion. Spherical aberration, halo, and coma aberration are small and are appropriately corrected by using a relatively high refractive index material as the material of the positive lenses and by utilizing aspheric effects.

The diffraction portion is formed on a surface convex towards the object side.

Thus, the influence of decrease in the diffraction efficiency and flare is reduced by decreasing an incidence angle of light incident on the diffraction portion.

In third lens unit C, a positive lens is located at a place closer to the object side than the diffraction portion.

Thus, the distribution of incidence angles of light rays incident upon the diffraction portion can be reduced. A zoom lens having good diffraction efficiency over the entire zooming range can be achieved.

Each exemplary embodiment utilizes aspherical surfaces.

A zoom lens, which causes minimal variation of spherical aberration, halo, and coma aberration, is achieved by adding an aspherical surface to the configuration thereof in addition to the utilization of the relatively high-refractive index material as the positive lenses and the aspheric effects of the diffraction portion.

The first exemplary embodiment is a zoom lens that has a zoom ratio of 81, in which an angle of view at a wide-angle end is 57° and an angle of view at a telephoto end is 0.78°.

The second exemplary embodiment is a zoom lens that increases the zoom ratio to 100 and reduces the angle of view at a telephoto end to 0.42°, as compared with the first exemplary embodiment.

The third embodiment is a zoom lens that has a zoom ratio of 117, in which an angle of view at a telephoto end is 0.38°.

The fourth exemplary embodiment is a zoom lens that increases the angle of view at a wide-angle end to 69° and increases also a zoom ratio to 105, as compared with the first exemplary embodiment.

The fifth embodiment is a zoom lens that has a zoom ratio of 44.

FIG. 41 illustrates an image pickup apparatus (television camera system) 125 using a zoom lens in each exemplary embodiment as an image pickup optical system. The image pickup apparatus 125 includes a zoom lens 101 according to one of the first to fifth exemplary embodiments. The image pickup apparatus 125 further includes a camera 124. The zoom lens 101 is detachable from the camera 124. Thus, the image pickup apparatus 125 is constituted by mounting the zoom lens 101 on the camera 124.

The zoom lens 101 includes a first lens unit F, a magnification variation portion LZ, a fourth lens unit R for image formation. The first lens unit F includes a focusing lens unit. The magnification variation portion LZ includes a second lens unit V configured to move along an optical axis for varying magnification, and a third lens unit C configured to move along the optical axis to compensate for variation of an image plane due to magnification variation.

The zoom lens 101 further includes an aperture stop SP. The fourth lens unit R includes a lens unit 105, a glass block 106 that can be detached from an optical path, and a lens unit 107.

The zoom lens 101 further includes an extender EX serving as a lens unit that can be replaced with the glass block 106 to change a focal length range of the entire zoom lens 101. The zoom lens 101 further includes drive mechanisms 114 and 115, such as a helicoid and a cam, for driving the lens unit F and the magnification variation portion LZ, respectively.

The zoom lens 101 further includes electric motors (drive units) 116, 117, and 118 configured to drive the drive mechanisms 114 and 115 and the aperture stop SP, respectively.

The zoom lens 101 further includes detectors 119, 120, and 121, such as an encoder, a potentiometer, and a photosensor, configured to detect the positions of the first lens unit F and the magnification variation portion LZ on the optical axis and an aperture diameter of the aperture stop SP, respectively.

The camera 124 includes a glass block 109, which corresponds to an optical filter and a color separation prism, and a solid-state image sensor (photoelectric conversion element) 110, such as a CCD sensor or a CMOS sensor, for receiving an image of an object formed by the zoom lens 101.

Central processing units (CPU) 111 and 122 control various operations of driving the camera 124 and the zoom lens 101, respectively.

Thus, an image pickup apparatus having high optical performance is implemented by applying the zoom lens according to an exemplary embodiment of the present invention to a television camera.

According to exemplary embodiments of the present invention, a zoom lens having high optical performance over the entire zooming range and an image pickup apparatus having such a zoom lens can be obtained.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-034759 filed Feb. 15, 2007, which is hereby incorporated by reference herein in its entirety.

What is claimed is:

1. A zoom lens comprising, in order from an object side to an image side:

a first lens unit having a positive refractive power;

a second lens unit having a negative refractive power configured to move during zooming;

a third lens unit having a positive refractive power configured to move during zooming; and a fourth lens unit having a positive refractive power, characterized in that the third lens unit includes a positive lens, a negative lens, and a diffractive optical element, and that a focal length (fc) of the third lens unit, a focal length (fdoe) of a diffraction portion of the diffractive optical element, a focal length (fW) at a wide angle end of the zoom lens, and a focal length (fT) at a telephoto end of the zoom lens satisfy the following conditions:

$$0.35 < fc/\sqrt{(fW \cdot fT)} < 0.81, \text{ and}$$

$$45 < fdoe/fc < 300.$$

2. The zoom lens according to claim 1 in which the first lens unit and the fourth lens unit are configured not to move for zooming.

3. The zoom lens according to claim 1, wherein, during zooming from the wide-angle end to the telephoto end, the second lens unit monotonously moves towards the image side, and the third lens unit monotonously moves towards the object side.

4. The zoom lens according to claim 1, wherein a lateral magnification ($\beta RT$) of a lens unit located closer to the image side than the third lens unit at the telephoto end satisfies the following condition:

$$0.60 < fc \cdot \beta RT/\sqrt{(fW \cdot fT)} < 0.90.$$

5. The zoom lens according to claim 1, wherein the focal length (fdoe) of the diffraction portion and the focal length (fT) at the telephoto end of the zoom lens satisfy the following condition:

$$2 < fdoe/fT < 30.$$

6. The zoom lens according to claim 1, wherein an average value ((1/vcp)ave) of a reciprocal of an Abbe number of a material of the positive lens included in the third lens unit satisfies the following condition:

$$0.016 < (1/vcp)ave < 0.030.$$

7. The zoom lens according to claim 1, wherein an average value ((1/vcp)ave) of a reciprocal of an Abbe number of a material of the positive lens included in the third lens unit and an average value ((1/vcn)ave) of a reciprocal of an Abbe number of a material of the negative lens included in the third lens unit satisfy the following condition:

$$0.012 < (1/vcn)ave - (1/vcp)ave.$$

8. The zoom lens according to claim 1, wherein an average value ((ncp)ave) of a refractive index of a material of the positive lens included in the third lens unit satisfies the following condition:

$$(ncp)ave > 1.60.$$

9. The zoom lens according to claim 1, wherein an image-forming magnification (βcT) of the third lens unit at the telephoto end and an image-forming magnification (βcW) of the third lens unit at the wide-angle end satisfy the following condition:

$$1.4 < |(\beta cW - \beta cT)|/\sqrt{(\beta cT \cdot \beta cW)} < 2.5.$$

10. The zoom lens according to claim 1, wherein the third lens unit includes two or more positive lenses, and
   wherein at least one of surfaces of the positive lenses included in the third lens unit is an aspheric surface.

11. The zoom lens according to claim 1, further comprising an aperture stop located at the image side of the third lens unit.

12. The zoom lens according to claim 1, wherein the focal length (fdoe) of the diffraction portion and a maximum diameter (D) of the diffractive optical element satisfy the following condition:

$$40 < fdoe/D < 250.$$

13. The zoom lens according to claim 1, wherein the zoom lens is configured to form an image on a photoelectric conversion element.

14. The zoom lens as claimed in claim 2 in which either the first lens unit or the fourth lens unit or both are moveable during zooming for purposes other than changing magnification.

15. An image pickup apparatus comprising:
a solid-state image sensor; and
a zoom lens configured to form an object image on the solid-state image sensor,
wherein the zoom lens comprises, in order from an object side to an image side:
a first lens unit having a positive refractive power configured not to move for zooming;
a second lens unit having a negative refractive power configured to move during zooming;
a third lens unit having a positive refractive power configured to move during zooming; and
a fourth lens unit having a positive refractive power configured not to move for zooming,
characterized in that the third lens unit includes a positive lens, a negative lens, and a diffractive optical element, and
that a focal length (fc) of the third lens unit, a focal length (fdoe) of a diffraction portion of the diffractive optical element, a focal length (fW) at a wide angle end of the zoom lens, and a focal length (fT) at a telephoto end of the zoom lens satisfy the following conditions:

$$0.35 < fc/\sqrt{(fW \cdot fT)} < 0.81, \text{ and}$$

$$45 < fdoe/fc < 300.$$

* * * * *